United States Patent [19]

Jabs et al.

[11] Patent Number: 5,173,933
[45] Date of Patent: Dec. 22, 1992

[54] INTERFACE BETWEEN MOBILE TELECOMMUNICATION STATIONS AND TRUNKS THAT LINK TO COMMUNICATION CARRIERS

[75] Inventors: Armin O. Jabs, White Marsh, Va.; Roy A. Hammel, Frederick, Md.; Jon E. Garner, Purcellville, Va.

[73] Assignee: World Communication Systems, Inc., Newport News, Va.

[21] Appl. No.: 587,958

[22] Filed: Sep. 25, 1990

[51] Int. Cl.[5] ............................................. H04M 11/00
[52] U.S. Cl. ........................................ 379/58; 379/111; 379/120; 379/133; 379/221
[58] Field of Search ................... 379/111–116, 379/120, 121, 133, 137, 140, 198, 201, 209, 220, 221, 207, 144, 154, 231, 95, 96, 406; 370/32.1

[56] References Cited

U.S. PATENT DOCUMENTS

| | | | |
|---|---|---|---|
| 3,705,523 | 12/1972 | Alouisa | 379/221 |
| 3,912,873 | 10/1975 | Skaperda . | |
| 3,935,394 | 1/1976 | Bulfer . | |
| 3,962,552 | 6/1976 | Reines et al. . | |
| 3,993,873 | 11/1976 | Bogda et al. . | |
| 4,199,665 | 4/1980 | Emrick et al. . | |
| 4,273,962 | 6/1981 | Wolfe | 379/115 |
| 4,284,852 | 8/1981 | Szybicki et al. . | |
| 4,345,116 | 8/1982 | Ash et al. . | |
| 4,400,587 | 8/1983 | Taylor et al. . | |
| 4,410,765 | 10/1983 | Hestad et al. . | |
| 4,486,626 | 12/1984 | Kohler | 379/221 |
| 4,503,288 | 3/1985 | Kessler | 379/96 |
| 4,517,411 | 5/1985 | Casner . | |
| 4,525,601 | 6/1985 | Barnich et al. . | |
| 4,555,594 | 11/1985 | Friedes et al. . | |
| 4,577,066 | 3/1986 | Bimonte et al. . | |
| 4,593,399 | 6/1986 | Baugh et al. | 370/32.1 |
| 4,654,482 | 3/1987 | DeAngelis | 379/95 |
| 4,656,656 | 4/1987 | Mundy, Jr. et al. . | |
| 4,656,658 | 4/1987 | King . | |
| 4,661,974 | 4/1987 | Bales et al. . | |
| 4,669,113 | 5/1987 | Ash et al. . | |
| 4,669,114 | 5/1987 | Reesor et al. | 379/231 |
| 4,685,127 | 8/1987 | Miller et al. | 379/221 |
| 4,704,724 | 11/1987 | Krishnan et al. . | |
| 4,741,027 | 4/1988 | Maisel et al. . | |
| 4,748,658 | 5/1988 | Gopal et al. . | |
| 4,751,728 | 6/1988 | Treat . | |
| 4,756,019 | 7/1988 | Szybicki . | |
| 4,763,316 | 8/1988 | Schaich et al. . | |
| 4,813,065 | 3/1989 | Segala . | |
| 4,831,649 | 5/1989 | Mejane . | |
| 4,862,496 | 8/1989 | Kelly et al. . | |
| 4,866,763 | 9/1989 | Cooper et al. . | |
| 4,873,517 | 10/1989 | Baratz et al. . | |
| 4,885,780 | 12/1989 | Gopal et al. . | |
| 4,901,347 | 2/1990 | Schmidt et al. . | |
| 4,991,166 | 2/1991 | Julstrom | 379/406 |

OTHER PUBLICATIONS

Article: University of Florence, Department of Electronics Engineering, Italy, "An Integrated Satellite-Cellular Land Mobile System for Europe", 7 pages.

Primary Examiner—James L. Dwyer
Assistant Examiner—Dwayne D. Bost
Attorney, Agent, or Firm—Godfrey & Kahn

[57] ABSTRACT

An interface between mobile telecommunication stations and trunks that link with communication carriers of various media comprises station channels (11, 12, 13, and 14) that connect to telecommunication stations, trunk channels (1, 2, 3, and 4,) that connect to trunks that link to communication carriers, software code executable for interrogating the trunk channels for availability, software code executable for determining the communication medium or network of least cost, and software code executable for routing the telephone call from one of the station channels to the available trunk channel linked to the communication carrier having the medium or network of least cost. If the routing is to a trunk line linked to satellite communications, the interface selects the coast earth station of least cost based upon the location of the ocean going vessel, the destination of the call, and other rate considerations. Call progress through the interface is supervised such that the call is terminated after an extended period of ring no answer, busy, dead air, etc. The invention also provides for automatic leveling and creates a detailed call record of all calls originating from the ship for billing purposes.

77 Claims, 30 Drawing Sheets

INTERFACE BETWEEN MOBILE TELECOMMUNICATION STATIONS AND TRUNKS THAT LINK TO COMMUNICATION CARRIERS

FIELD OF THE INVENTION

This invention relates generally to least cost routing of telephone calls and specifically to an interface for such function between mobile telecommunication stations and trunks that link to communication carriers of various communication networks or media.

BACKGROUND OF THE INVENTION

On oceangoing vessels, it is common practice to place outgoing telephone calls from the vessel through a radio officer stationed aboard the vessel in a radio room. In order to place such a call, a calling party will call the radio officer from a cabin or booth to make a request for such a call and the radio officer will request information as to how the call is desired to be routed, for example, via satellite transmission (and if so, via which coast earth station), cellular lines, etc. The radio officer then sets up the call by arranging to get the called party on line, and then calls the calling party back at the cabin or booth to complete the connection. The radio officer then monitors the call and times the call with a stopwatch or other means in order that the calling party is appropriately billed for the outgoing telephone call.

As may be apparent from the foregoing, the placement of an outgoing telephone call from an oceangoing vessel is difficult and expensive. The calling party and radio officer must themselves decide the routing of the telephone calls, and the cost of such calls must be necessarily include the overhead associated with the radio officer.

Accordingly, a need has existed for a device for automating the placement of outgoing telephone calls aboard an oceangoing vessel and for such device to route the call in an economical manner.

SUMMARY OF THE INVENTION

In accordance with the present invention, an interface between mobile telecommunication stations and trunks that link with communication carriers or various communication media is disclosed. The interface comprises station channels that connect to the telecommunication stations, trunk channels that connect to the trunks that link to the communication carriers, means for interrogating the trunk channels for availability, means for determining the communication medium of least cost, and means for routing the telephone call from one of the station channels to the available trunk channel linked to the communication carrier having the medium of least cost. Exemplary telecommunication stations include telephones, facsimile machines, modems, or stations of a private branch exchange (PBX). Exemplary communication media include satellite communications, cellular lines, or land lines.

The present invention has a programmable routing feature such that it automatically provides the route from one of the station channels to the available trunk line linked to the communication carrier having the medium of least cost. If the routing is to a trunk line linked to satellite communications, the interface selects the coast earth station (CES) of least cost based upon the location of the oceangoing vessel, the destination of the call, and other rate considerations.

The invention has additional features that automate the process of placing an outgoing telephone call from an oceangoing vessel. For example, where the link is via satellite, the interface will send a string of electronic signals appropriate to access a satellite to effect the satellite communication. The calling party, or subscriber, dials the desired telephone number following the North American dialing plan and the call is processed automatically by the adding or stripping of the necessary touch-tone commands to the subscriber dialed telephone number so that the number may be understood correctly by the selected carrier. Such routing and redialing is invisible to the subscriber.

Call progress through the interface is supervised such that the call is terminated after an extended period of ring no answer, busy, dead air, etc. To prevent telephone abuse or a misrouted or dropped connection from tying up the interface of the present invention for an indefinite period. The invention provides for automatic leveling and echo suppression. The invention also creates a detailed call record of all calls originating from the ship for billing purposes.

Further objects, features, and advantages of the invention will be apparent from the following detailed description taken in conjunction with the accompanying drawings.

DETAILED DESCRIPTION OF THE PREFERRED EMBODIMENT

Figure 1:
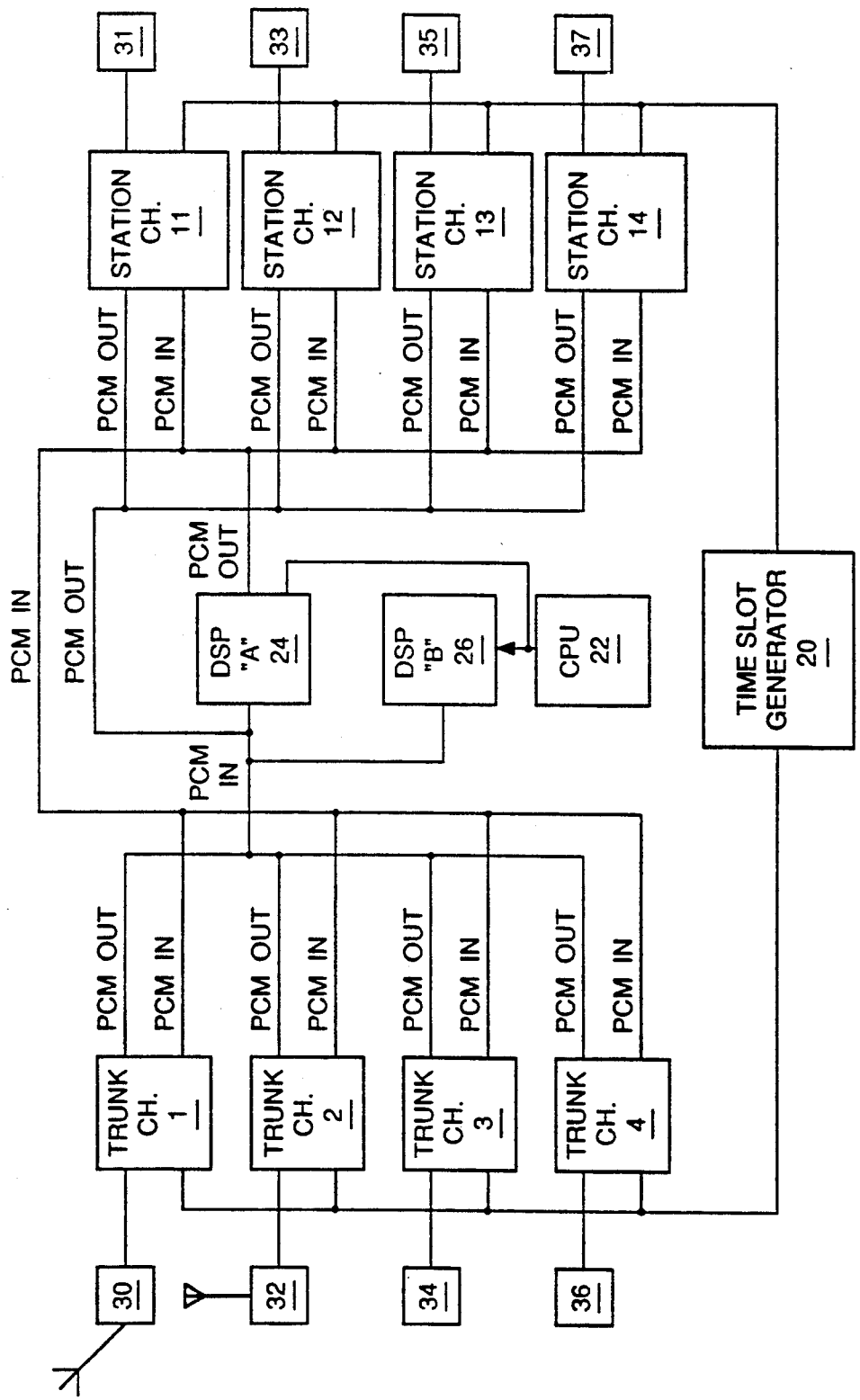
FIG. 1 is a simplified block diagram of an interface between a plurality of telecommunication stations and a plurality of trunks that link to communication carriers of various media in accordance with the present invention.

The present invention is an interface between a plurality of telecommunication stations and a plurality of trunks that link to communication carriers of various communication media, the interface being specially adapted for use in a mobile environment such as an oceangoing vessel. A telecommunication station is defined herein to mean any telecommunication device generally, and is inclusive of telephones, facsimile machines, modems, or individual subscriber stations of a private branch exchange (PBX) or private automatic branch exchange (PABX). As used herein, the terms "communication medium," "communication network,"- 'and "communication carrier" are distinguished from each other. A communication medium is defined herein as any of various transmission means to accomplish the connection of the outgoing telephone call between the calling party at the telecommunication station and the called party outside of the oceangoing vessel. Exemplary communication media include satellite communications, cellular lines, and land lines when the oceangoing vessel is docked and plugged into the local telephone network. A communication network is defined herein as a collection of carriers of the same medium that share access to that medium. A communication carrier is defined as the specific agent through which a connection is made. For example, where the medium is satellite communications, the networks include Inmarsat, Panamsat, and Intelsat and each of these networks is represented by a satellite or group of cooperative satellites. Within a satellite network such as Inmarsat, the different carriers are represented by the different coast earth stations through which an outgoing telephone call from an oceangoing vessel may be routed. Coast earth stations within the Inmarsat network include Ata, Turkey; Fucino, Italy; Goonhilly, UK; Maadi, Egypt; Odessa, USSR; Pleumeur Bodou, France; Psary, Poland; Southbury, USA; Tangua, Brazil; Umm-Al-Aish, Kuwait; Ibaraki, Japan; Nakhodka, USSR; Perth, Australia; Santa Paula, USA; Singapore, Singapore; Eik, Norway; Jeddah, Saudi Arabia; Thermopylae, Greece; and Yamaguchi, Japan. For cellular, exemplary networks include Centel Cellular, Cellular One, Boatphone, Bell South Mobility, McCaw, Pactel Mobile Access, and GTE Mobilenet. When the oceangoing vessel is docked, the network is dependent upon the country of docking. In the United States network, the different carriers include AT&T, MCI, and Sprint.

As further used herein, an actively mobile interface is defined such that even in a state of motion, is operable as an interface which is actively performing its function within the system (i.e., mobile environment). The operations of the interface in this regard are explained in greater detail below.

The interface is comprised of circuitry and other hardware components such as station channels that are connected to telecommunication stations and trunk channels that are connected to trunks that link to the communication carriers of various media, and software that drives the interface. The interface of the present invention automates and enhances the capabilities of shipboard communication systems. In the embodiment described herein, the interface has a pre-defined number of station channels and the same number of trunk channels that are interconnected by a pulse code modulated (PCM) "highway." The interface has a programmable routing feature such that it automatically provides the route from one of the station channels to the available trunk channel linked to the communication carrier having the medium of least cost. The communication medium of least cost is determined by selecting the appropriate medium according to a hierarchy. If the ship is docked and there is a land line plugged in and available, the interface will route a telephone call originating from a station channel to the trunk channel connected to the land line. If the trunk channel connected to the land line is not available, the interface looks for a trunk channel connected to a cellular line and, if available, routes the telephone call accordingly. If neither land line nor cellular line is available, the interface will route the call to a trunk channel that is connected to a trunk that links to a plurality of carriers via satellite communications. The interface then selects the CES of least cost based upon the ocean area in which the vessel is sailing, the destination of the call, the time of day, and any preferential rates extended to the shipping line.

In order to call outside of the ship, the user dials the desired telephone number following the North American dialing plan and the call is processed automatically. Because the different communication media or carriers require different access codes, the interface automatically captures and interprets the subscriber dialed telephone number, determines the least cost route, and redials by the adding or stripping of the necessary digits to the subscriber dialed telephone number so that the number may be understood correctly by the selected carrier. For the case of a call completed via satellite communications, the interface will also automatically send a string of electronic signals appropriate to access a satellite to effect the satellite communication. Such routing and redialing is invisible to the subscriber.

Call progress through the interface is supervised to insure the presence of voice or data activity such that call "tear down" (that is, call termination) occurs after a period of ring no answer, busy, dead air, etc. Such call monitoring prevents telephone abuse or a misrouted call or dropped connection from tying up the interface of the present invention for an indefinite period. The interface provides for automatic leveling by compensating the audio level for differences between the communication media to standardize voice audio, and further adjusts the level for data transactions. The interface also provides echo suppression for telephone calls via satellite to remove echo signals from signal reflections.

The interface of the present invention provides a accurate call record of all calls originating from the ship for billing purposes. Such a call record simplifies call accounting procedures and allows for third-party re-billing. The call records include the following information: date, time, cabin number (if applicable), trunk channel and/or communication medium or network, dialed number, duration, and call progress (for example, ring no answer, busy, intercept message, speech detection, answer detection, no connection silence, or detection of modem signaling).

FIG. 1 represents a simplified block diagram of the interface hardware. The interface comprises first, second, third, and fourth trunk channels 1, 2, 3, and 4, station channels 11, 12, 13, and 14, a time slot generator 20, a central processing unit (CPU) 22, a first digital signal processor 24, a second digital signal processor 26, and connective wiring therebetween. The audio at each of the channels 1, 2, 3, 4, 11, 12, 13, and 14 is sampled and digitized, the pathways between the above-named components forming a PCM "highway" such that connections are routed between any one of the four station channels 11, 12, 13, and 14 to any unoccupied one of the four trunk channels 1, 2, 3, and 4 in a time-division multiplex arrangement. The different wires of the PCM "highway" are designated as "PCM IN" or "PCM OUT" to indicate the direction of the information conveyed within. The time slot generator 20 generates the time divisions or slots during which each of the "highways" into and out of each of the channels 1, 2, 3, 4, 11, 12, 13, and 14 are conveying audio information that has been digitized. The first digital signal processor 24 performs tone generation for all of the satellite communications and telephony single and dual tones, cross point switching between the trunk channels 1, 2, 3, and 4 and the station channels 11, 12, 13, and 14, and the transmission leveling function. The second digital signal processor 26 performs all of the tone decoding of all of the satellite communication tones and telephony single and dual tones. A suitable digital signal processor for use as the first digital signal processor 24 and the second digital signal processor 26 is the ADSP-2105 DSP Microcomputer made by Analog Devices of Norwood, Mass. The CPU 22 is a microprocessor that controls the functions of the interface of the present invention. Each of the trunk channels 1, 2, 3, and 4 is connected to a respective terminal 30, 32, 34, and 36 that is connected to a link with a medium of communication. For example, the terminal 30 may be connected to a satellite dish antenna to effect satellite communications, the terminal 32 may be connected to a cellular line antenna, the terminal 34 may be a plug to connect with a land line, and a terminal 36 may link with yet another type of communication medium. The terminals 30, 32, 34, and 36 may be connected to links with communication media of any combination and there may be more than one terminal that is dedicated to a particular communication medium. Each of the station channels 11, 12, 13, and 14 is connected to a respective telecommunication station 31, 33, 35, and 37.

Figure 2:
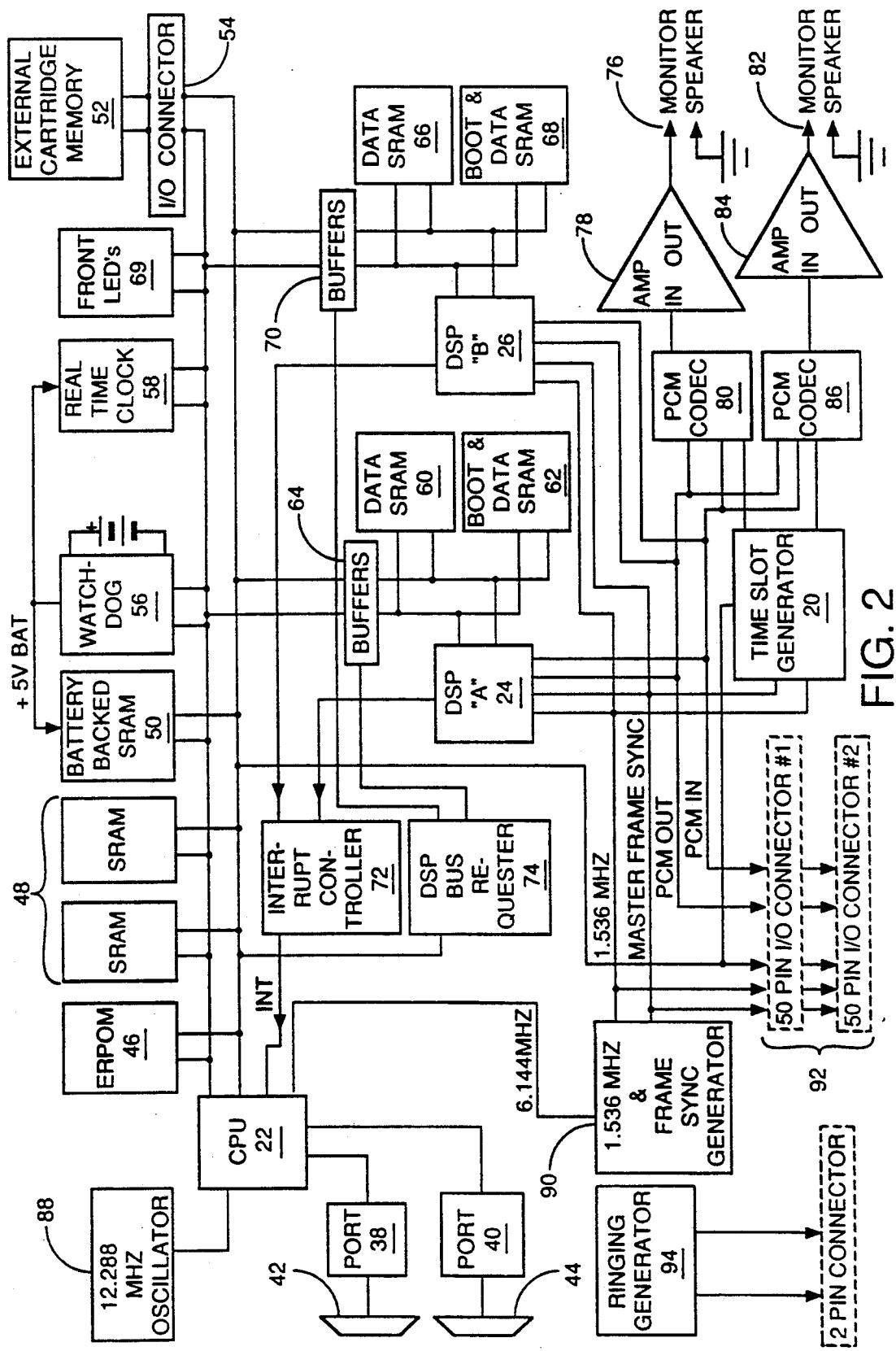
FIG. 2 is a block diagram of the main, or processor, board of the interface of the present invention.
Figure 3A:
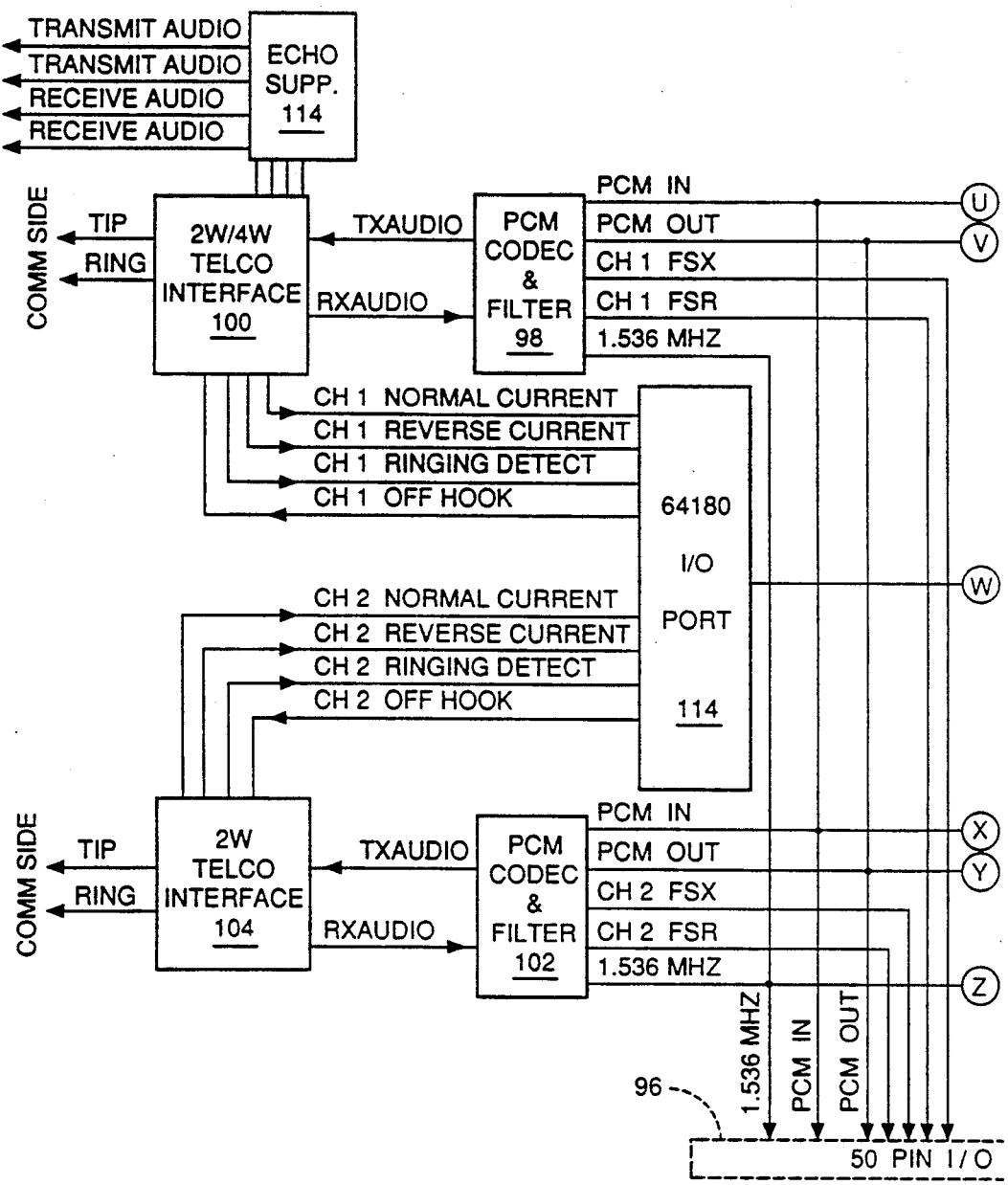
FIGS. 3A-3B comprise a block diagram of the interface board of the interface of the present invention.
Figure 3B:
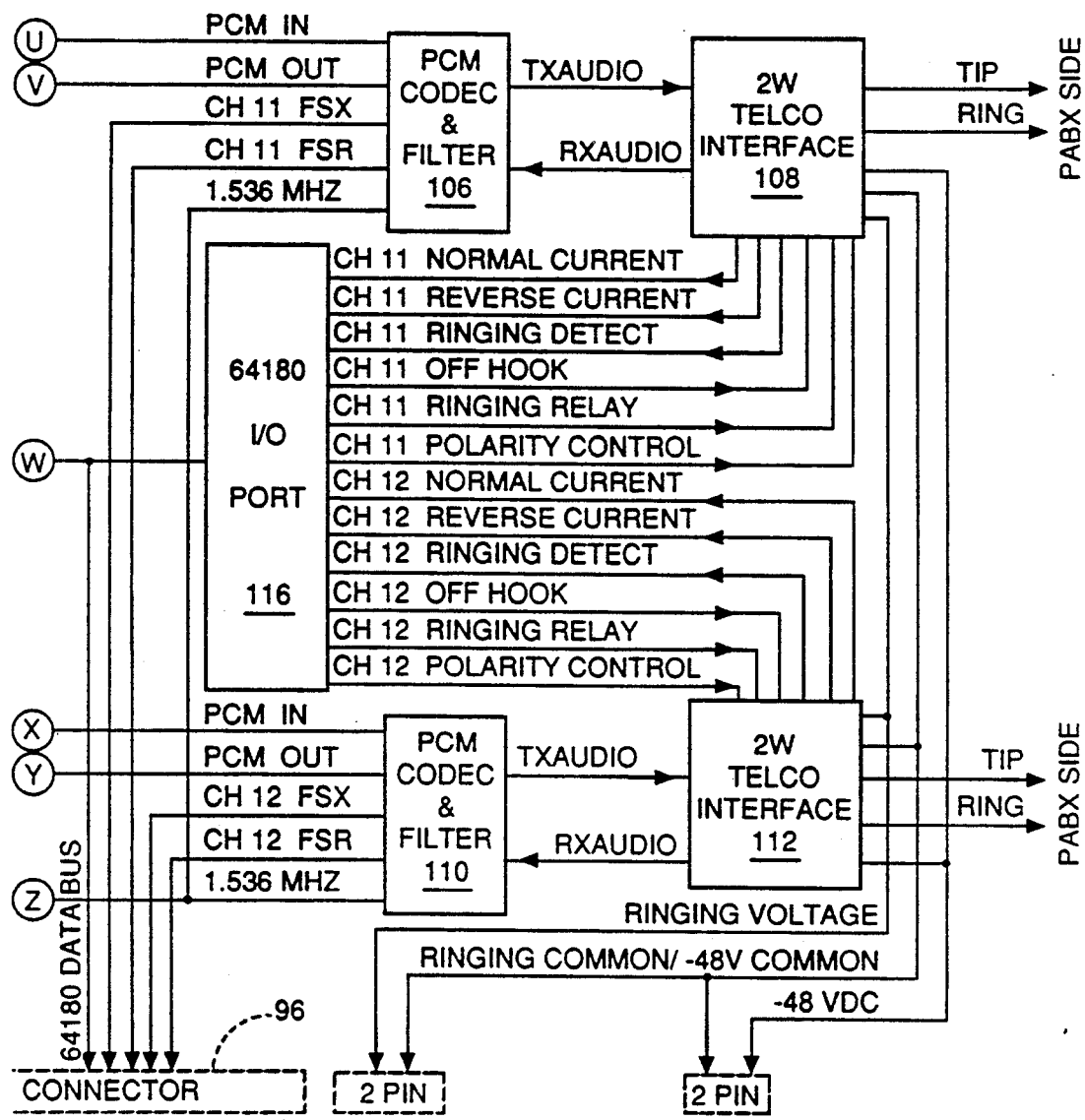

The circuitry associated with the interface of the present invention is comprised of a main, or processor, board as represented in FIG. 2 and an interface board as represented in FIG. 3. The wiring of the components of the main and interface boards is generally as shown in the figures and specific pin connections will be easily determinable by one skilled in the art. The main board is controlled by the CPU 22, which is preferably a 64180 microprocessor, an enhanced version of the industry standard Z80 microprocessor. The CPU 22 as represented by the 64180 microprocessor has an internal Memory Management Unit which controls 1M bytes of memory, two counter/timers, two direct memory access (DMA) controllers, two asynchronous serial channels, and a programmable wait state generator.

The asynchronous serial channels of the CPU 22 are connected to RS-232 ports 38 and 40 that enable external connection to the main board through respective right angle DB25S connectors 42 and 44. One of the ports 38 or 40 may, for example, be connected to a printer, a station message detail recording device (SMDR), or other output-only device. The other of the ports 38 or 40 may, for example, be connected to a bidirectional device such as a computer terminal.

The CPU is supported by a 32K byte EPROM 46, 16K bytes of standard RAMs 48, 8K bytes of battery backed-up static RAM 50, and an external memory cartridge 52. The program code resides in the external memory cartridge. The external memory cartridge 52 is a 32K EPROM that holds tables for least cost routing and the program source code for the CPU 22 and the digital signal processors 24 and 26. The external memory cartridge 52 is connected to the main board at an input/output connector 54. The input/output connector 54 is a socket at which the external memory cartridge 52 may be easily plugged into or unplugged out of the main board. Where the interface of the present invention is within a housing, the ability to plug or unplug the external memory cartridge 52 allows for easy upgrading of both tariff information and system code without requiring the opening of such housing or any special programming or erasing equipment. The external memory cartridge 52 is completely reusable.

Upon initialization of the interface of the present invention, the software code residing in the external memory Cartridge 52 is downloaded into the static RAMs 48. The static RAM 50, a watchdog circuit 56, and a real time clock 58 have a back-up power supply independent of the rest of the interface of the present invention. The static RAM 50 also is downloaded with the software code and maintains a memory of call information. The CPU 22 is required to address the watchdog circuit 56 periodically (for example, once per second) and in the event the CPU 52 fails to address the watchdog circuit 56, the watchdog circuit 56 will generate a hardware reset. The real time clock 58 maintains the current date and time in order that the times that all calls are initiated and terminated may be accurately recorded.

The first digital signal processor 24 is supported by a boot and data static RAM 60, a static RAM 62, and buffers 64. The boot and data static RAM 60 and the static RAM 62, are downloaded with program code upon initialization. The buffers 64 are communication windows that enable the CPU 22 and the first digital signal processor to exchange information back and forth. The second digital signal processor 26 is supported by a boot and data static RAM 66, a static RAM 68, and buffers 70 that are analogous to the boot and data static RAM 60, the static RAM 62, and the buffers 64 of the first digital signal processor 24.

The main board of FIG. 2 includes an interrupt controller 72 and a digital signal processor (DSP) bus requestor 74. The interrupt controller 72 polls the outputs of the first and second digital signal processors 24 and 26 to inform the CPU 22 of a particular event that has taken place. For example, if the CPU 22 has requested the first digital signal processor 24 to look for a particular frequency tone and the tone has occurred and been detected, the interrupt controller 72 will order and interrupt the control line back into the CPU 22 to notify the CPU 22 that such action has indeed taken place. The DSP bus requestor 74 allows the CPU 22 to communicate directly with the first and second digital signal processors 24 and 26. Upon a request by the CPU 22, the CPU 22 will write information into the data RAMs 60 and 62 when enabled at the appropriate time by the buffers 64 and 70.

The main board has a monitor port 76 with an associated amplifier 78 and a digital-to-analog converter 80, and a second monitor port 82 with an associated amplifier 84 and a digital-to-analog converter 86. The monitor ports 76 and 82 may be phono-type jacks to which a speaker or other audio output device may be plugged. The digital-to-analog converters 80 and 86 are connected to the time slot generator 20 such that a call may be monitored for diagnostic purposes by listening to information in the appropriate time slots. For example, if it was desired to monitor a conversation that has been routed between station channel 14 and trunk channel 2, the time slots for each of these channels may be selected to be outputted, one of the channels through monitor port 76 and the other of the channels through monitor port 82. Such an outputting is made possible by appropriate software programming and inputting such instructions through, for example, touch-tone commands. It would be possible to select both sides of a given call or one side of two different calls, depending on the commands entered.

Also on the main board is a 12.288 MHz oscillator 88 that inputs to the CPU 22, a 1.536 MHz and frame sync generator 90 that keeps the interface of the present invention in synchronization, and input/output connectors 92 that connect the main board to the interface board. A ring generator 94 generates the necessary voltage to ring the PBX telephones. A collection of front LEDs 96 may also be connected to light up in association with various software diagnostics or to show the interface as properly operating.

The interface board is shown in FIG. 3 and is connected to the main board of FIG. 2 such that the input/output connectors 92 of FIG. 2 are connected to the input/output connectors 96 of FIG. 3. Each channel comprises a PCM CODEC and filter (such as the T7513A manufactured by AT&T Microelectronics) and a telecommunication port. PCM CODEC and filter 98 and telecommunication port 100 are associated with one of the trunk channels; PCM CODEC and filter 102 and telecommunication port 104 are associated with a second one of the trunk channels; PCM CODEC and filter 106 and telecommunication port 108 are associated with one of the station channels; and PCM CODEC and filter 110 and telecommunication port 112 are associated with a second one of the station channels. The PCM CODEC and filters 98, 102, 106, and 110, and the telecommunication ports 100, 104, 108, and 112 are representative of two trunk channels and two station channels that may be represented in a single "card." In order that there be four trunk channels and four station channels such as depicted in FIG. 1, there would be a second "card" used to represent two additional trunk channels and two additional station channels. By use of additional "cards" the interface is upgradeable to have additional trunk and station channels. It is to be understood that the invention is not limited to a specific number of station channels or trunk channels. The PCM CODEC and filters 98, 102, 106, and 110 provide analog-to-digital and digital-to-analog conversion and additionally provide the transmit and receive filtering necessary to interface a voice telephone circuit to a time-division multiplexed system. The telecommunication ports 100, 104, 108, and 112 are jacks or plugs to allow attachment of telecommunication stations to the station channels and attachment of communication terminals to the trunk channels.

Each of the telecommunication ports 100, 104, 108, and 112 have lines that represent "normal current," "reverse current," "ringing detect," and "off hook" that are connected to input/output ports 114 and 116 of the CPU 22. The station ports 108 and 112 additionally have lines that represent "ringing relay" and "polarity control" that are connected to input/output ports 116 of the CPU 22. Each of the ports 100, 104, 108, and 112 have "tip" and "ring" wire connections. Between each of the telecommunication ports 100, 104, 108, and the respective PCM CODEC and filters 98, 102, 106, and 110 are wires that transmit and receive analog information. Digitized information entering and exiting the PCM CODEC and filters 98, 102, 106, and 110 are conveyed on PCM IN and PCM OUT wires as part of the PCM highway. Also input into each of the PCM CODEC and filters 98, 102, 106, and 110 is a line from the 1.536 MHz and frame sync generator 90, a frame sync transmit line (FSX), and a frame sync receive line (FSR). The frame sync transmit and receive lines are triggers to prompt the channel to send or receive data. The 1.536 MHz line is a master bit clock and maintains synchronization in the various components of the interface. The timing value of 1.536 MHz is used herein only as an example; other timing values are possible.

The trunk port 100 is capable of connecting with a communication terminal having either two wires or four wires. A four wire connection is sometimes necessary for certain satellite terminals. Four wire connections (having two audio transmit and two audio receive lines) are characterized by appreciable propagation delay. For the case of four wire connections, therefore, an echo suppressor 114 is employed. A suitable echo suppressor for use as the echo suppressor 114 is a Tellabs 4101 Echo Suppressor available from Tellabs Incorporated of Lisle, Ill. The echo suppressor 114 removes echos resulting from signal reflection at impedance discontinuities and interpath coupling points, such as in four wire to two wire interface points, as is the case here.

FIGS. 4-21 are flow charts detailing the steps executed by the software associated with the interface of the present invention. The CPU 22 executes the steps detailed in FIGS. 4-19, the first digital signal processor 24 executes the steps detailed in FIG. 20, and the second digital signal processor 26 executes the steps detailed in FIG. 21.

Figure 4:
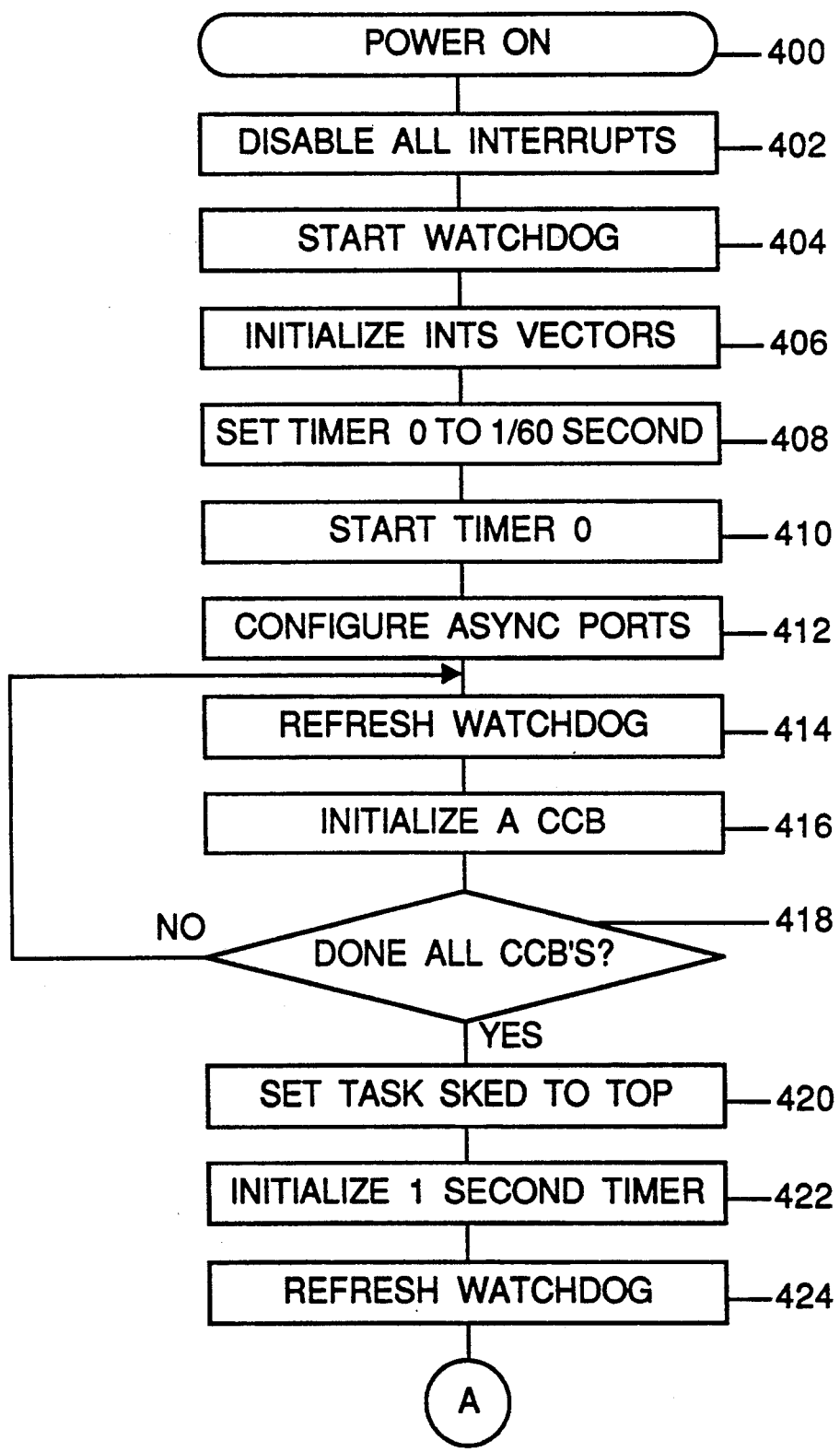
FIG. 4 is a flow chart detailing the initialization of the interface between mobile telecommunication stations and trunks that link to communication carriers of the present invention.
Figure 5:
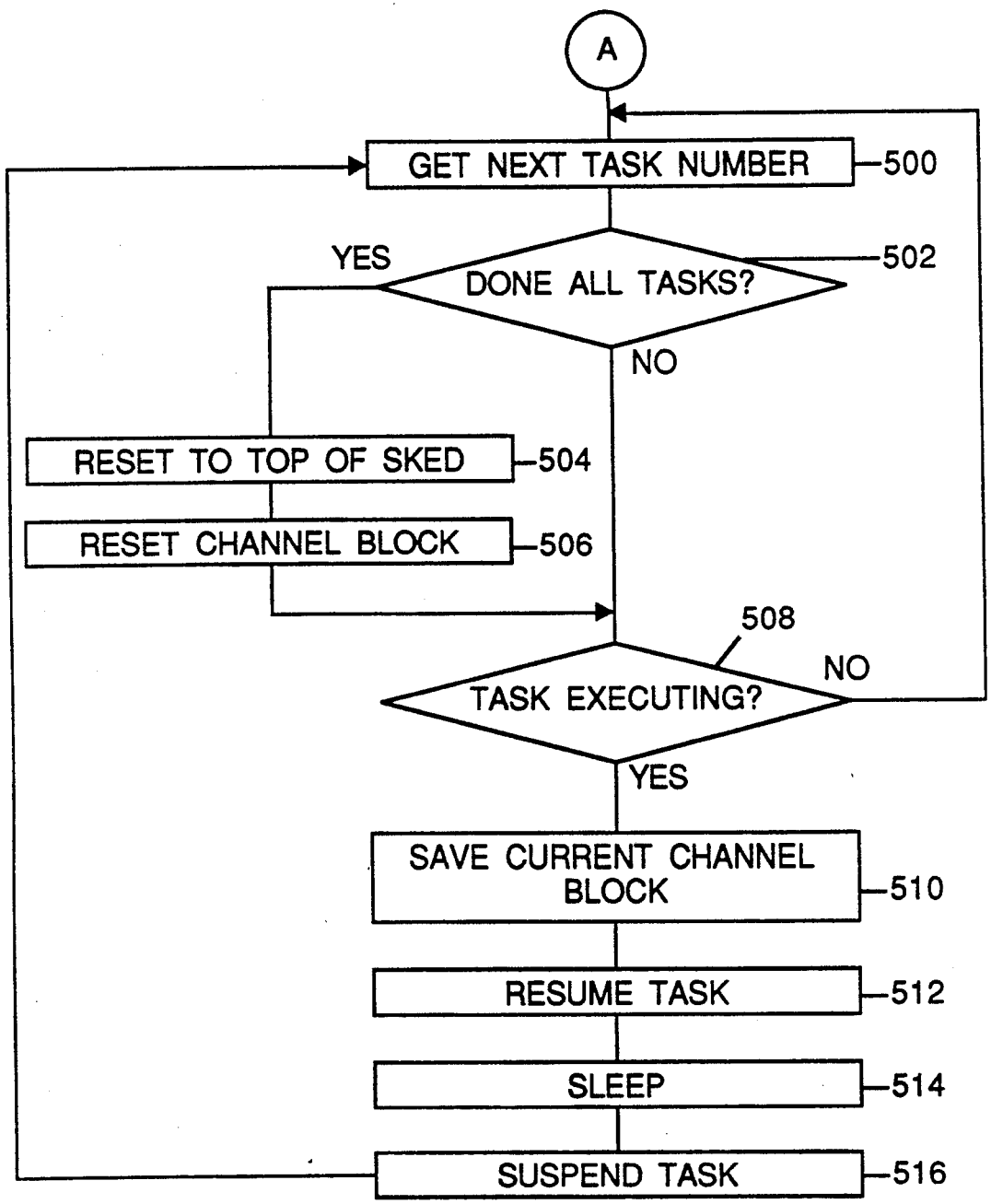
FIG. 5 is a flow chart detailing the multi-tasking dispatcher of the interface.

FIG. 4 details the steps executed by the software to initialize the interface of the present invention. When powered at 400, the CPU 22 disables all interrupts of the interface at 402 such as interrupts associated with the digital signal processors 24 and 26, timers of the CPU, and the asynchronous serial ports 38 and 40. The watchdog 56 is started at 404 and interrupt vectors associated with the signal processors, timers, serial ports, and the like are then initialized at 406. At 408, an internal timer of the CPU 22 designated as "0" is set and the timer "0" is started at 410. The asynchronous serial ports 38 and 40 are configured at 412 to user programmable parameters relating to baud rate, parity, start bits, stop bits, and the like. A loop is then commenced to initialize each of the channel control blocks, wherein a channel control block is a block of memory assigned to carry all of the data about a given channel. The watchdog 56 is "refreshed" at 414, one of the channel control blocks is initialized at 416 and if not all of the channel control blocks have been initialized, the process will begin again at another channel control block at 414. If all of the channel control blocks have been initialized at 418, then the CPU 22 continues at 420 to set the task schedule to begin at the "top." The task schedule is an ordering of tasks to be performed by the task dispatcher, which is depicted in FIG. 5 and discussed below. A second timer of the CPU 22 is initialized at 422 and the watchdog 56 is again "refreshed" at 424.

Figure 6A:
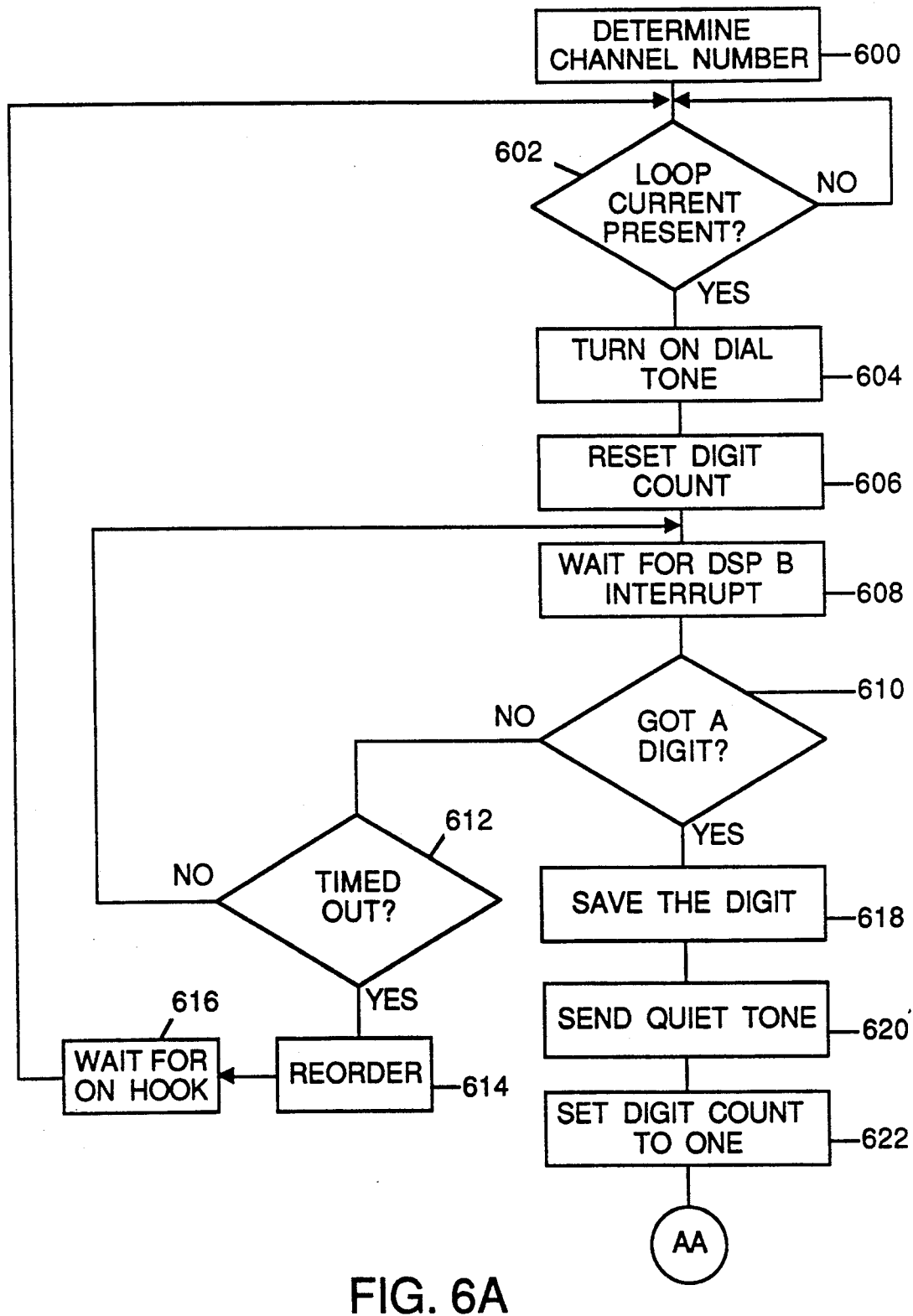
FIG. 6A is a flow chart detailing the telecommunication station tone decoder.
Figure 6B:
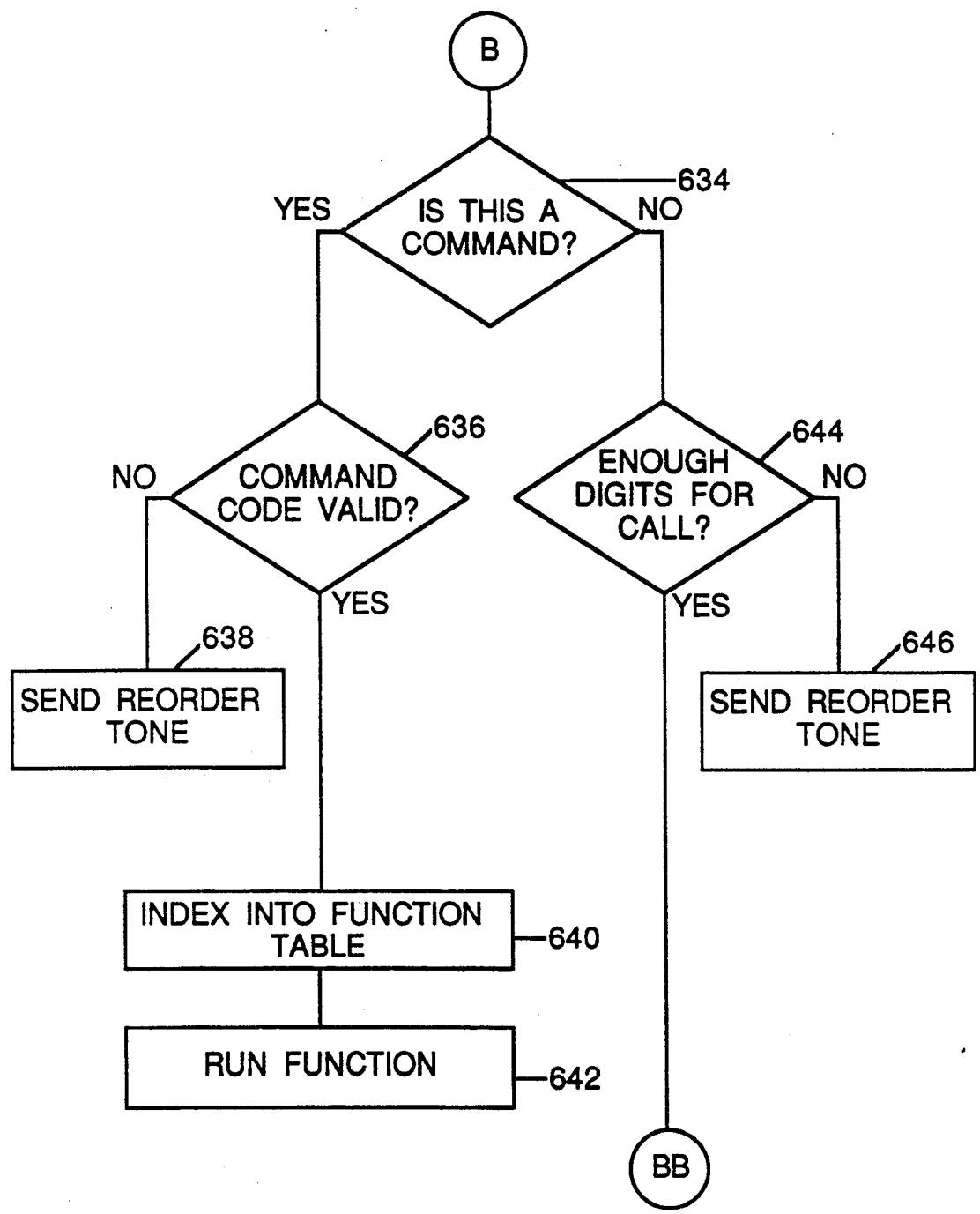
FIG. 6B is a continuation of the flow chart of FIG. 6A detailing the telecommunication station tone decoder.
Figure 6B:
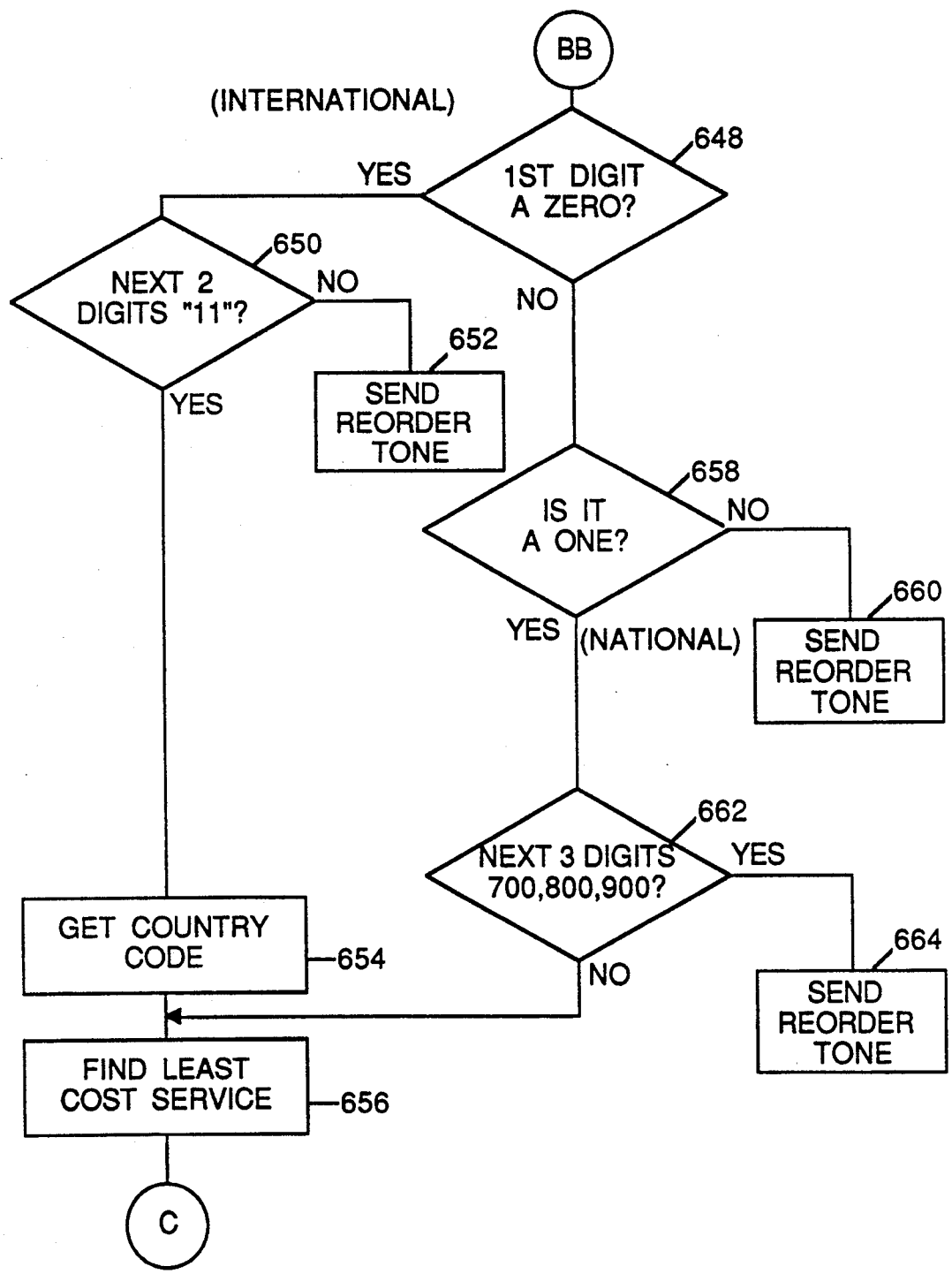
Figure 6C:
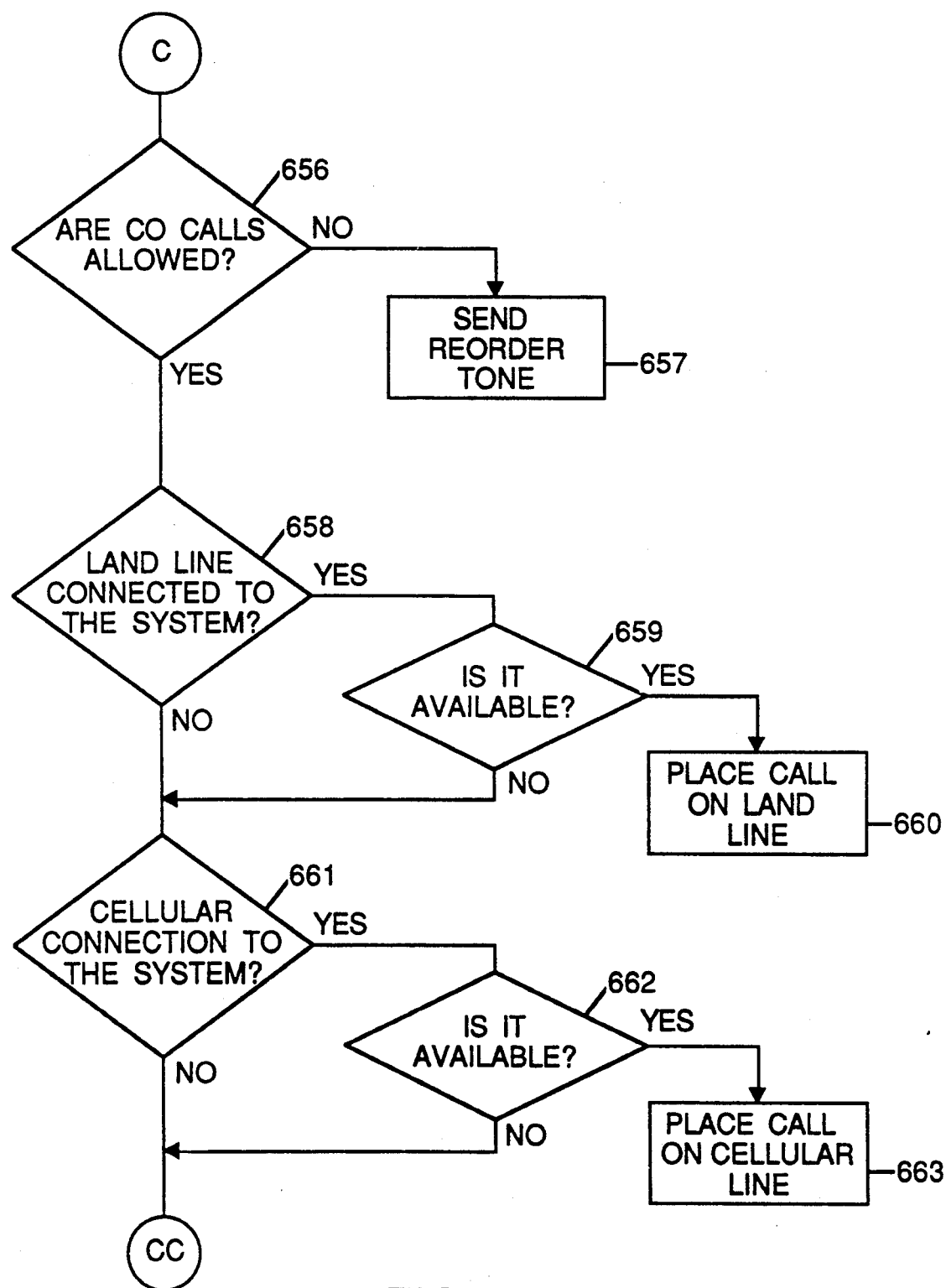
FIG. 6C is a continuation of FIG. 6B detailing the telecommunication station tone decoder, and specifically the least cost routing feature.
Figure 6C:
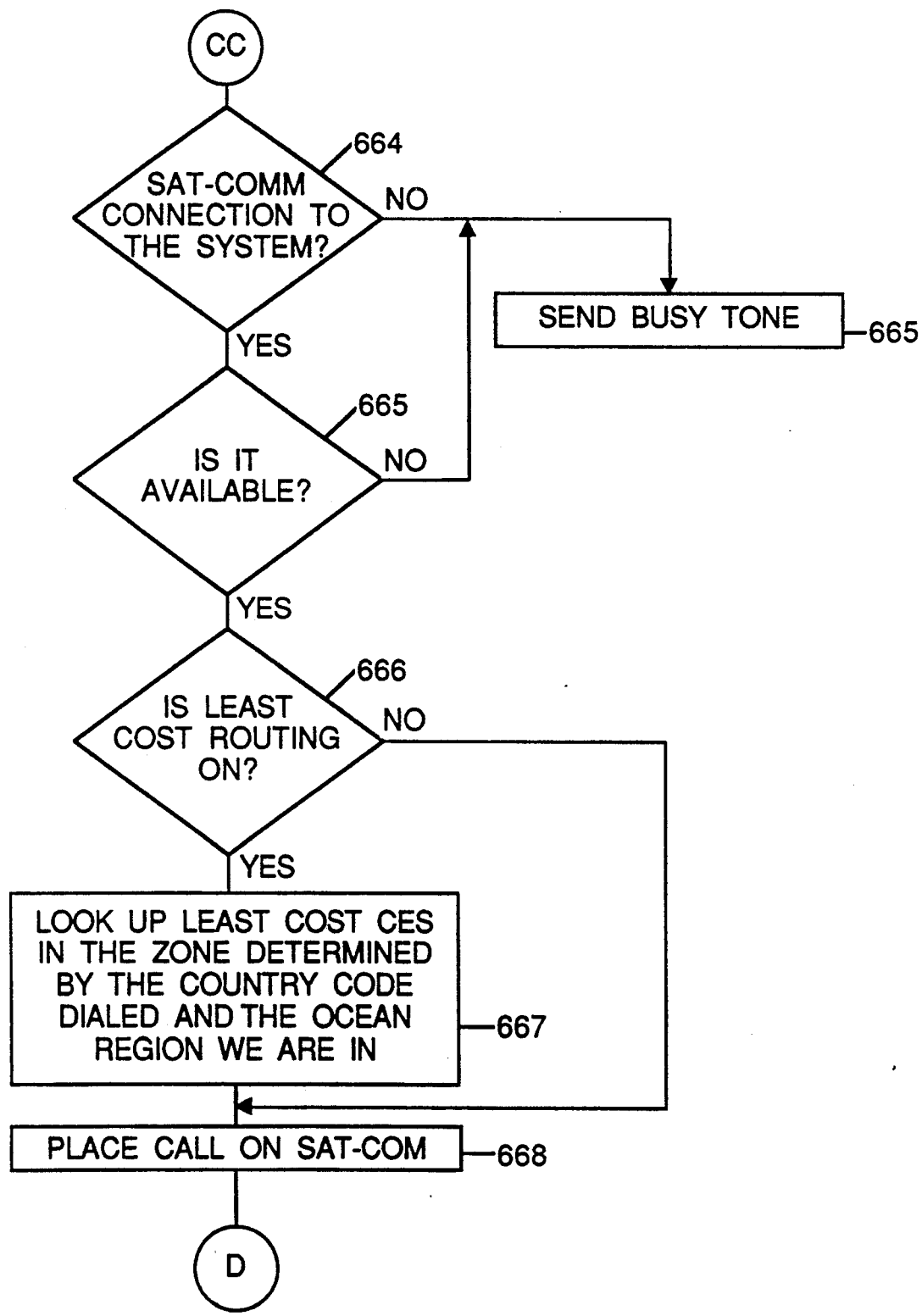

Upon completion of the initialization steps, a multitasking dispatcher is entered as shown in FIG. 5. The dispatcher is a task executing loop that begins by obtaining the next task number, a reference to one of a plurality of tasks performed by the software of the interface. The tasks include: decoding of a tone originating from one of the telecommunication stations (as depicted in FIGS. 6A, 6B, and 6C), decoding and driving of a tone originating from one of the communication terminal trunks (FIGS. 7A and 7B), ringing of a ringer (FIG. 8), a digital signal processor service routine (FIG. 9), entering of a password (FIG. 10), setting of the current ocean region (FIG. 11), setting to allow outgoing calls through the trunks (FIG. 12), setting of the PABX SMDR interface on/off (FIG. 13), setting of the least cost routing on/off (FIG. 14), setting of the channel routing sequence (FIGS. 15A and 15B), setting of the trunk channel parameters (FIGS. 16A and 16B), setting of the default coast earth stations (FIG. 17), setting of the configuration password (FIG. 18), and setting of the dial access password (FIG. 19). The dispatcher obtains the current task number that has been queried at 500 and determines whether all tasks in the sequence have been scanned at 502. If all of the tasks have not yet been scanned, then the task schedule is reset to the "top" at 504 and the channel blocks are reset at 506. Upon resetting of the channel blocks at 506 or if not all tasks have been done at 502, then a determination is made by the dispatcher at 508 whether a task is being executed. If no task is being executed at 508, then the dispatcher loops back to obtain the current task at 500. If a task is being executed at 508, then the current channel control block associated with originating channel is saved at 510. The task is then resumed at 512, the dispatcher goes to sleep at 514, and the task is suspended at 516. Upon suspension of the task at 516, the next queried task is obtained by looping back to 500. The suspended task is resumed when that task is again queried at 500.

FIGS. 6A, 6B and 6C represent the telecommunication station tone decoder. The decoder scans each of the station channels 11, 12, 13, and 14. Upon a scan of a particular channel, the system will determine the channel number or designation at 600 and proceed to determine if loop current is present at 602. Loop current from a telecommunication station indicates that the subscriber has gone off hook or picked up the phone or other telecommunication device and is seeking an outgoing connection. If there is no loop current present, the system will continue to scan for loop current. If loop current is present, however, a dial tone will be turned on at 604 and a digit count will be reset at 606. The digit count seeks to count the number of independent DTMF (dual-tone multifrequency) tones (touchtones) that have been entered as digits in a dialing sequence. An interrupt from the second digital signal processor 26 is then awaited at 608 and during such interrupt, the operating system will ask whether such a digit of a dialing sequence has been received at 610. A time limit for entry of digits is in effect and if such period has lapsed at 612 without receipt of a digit at 610, a reorder tone will be generated to the subscriber at 614 and the decoder will wait for the line to go on hook at 616 and the system will then again scan for loop current at 602. If the time limit for entry of digits has not lapsed at 612, the system will again await an interrupt from the second digital signal processor 26 at 608. If a digit is received at 610, the digit is captured or saved at 618, a quiet tone is sent to the appropriate telecommunication station channel at 620, and the digit count is set to one at 622. An interrupt from the second digital signal processor 26 is then again awaited at 624 and a time limit for entry of additional digits is in effect and if such a period has not lapsed at 626, the decoder will ask whether an additional digit of the dialing sequence has been received at 628. If no additional digit is received at 628, the system continues to Wait for an interrupt from the second digital processor 26 at 624. Where such an additional digit of the dialing sequence has been received at 628, the digit is saved at 630, and the digit count is incremented at 632 to keep track of the number of dialed digits. If the time limit for entry of an additional digit has not lapsed at 626, the system will then distinguish whether or not the dialing sequence is a command or an outgoing telephone call at 634 (continuing in FIG. 6B). If the dialing sequence is recognized as a command by, for example, the start sequence or by the digits themselves, the system will then determine whether the command code is valid at 636. If the command code is not valid, a reorder tone will be generated at 638. If the command code is valid at 636, an index into a function table will be reviewed at 640 and the function will be run at 642. The possible functions include password entry, setting of the current ocean region, setting to allow outgoing through the trunks, setting of the PABX SMDR interface on and off, setting of the least cost routing on and off, setting of the channel routing sequence, setting of trunk channel parameters, setting of default coast earth stations, setting of the configuration password, and setting of the dial access password, explained below in FIGS. 10-19. If the dialing sequence is determined not to be a command at 634, it will then be determined whether there are enough digits for a call at 644. If there are not enough digits for a call, a reorder tone to the appropriate telecommunication station will be sent to the subscriber at 646. If there are enough digits for a call, the operating system will then ask whether the first digit dialed is a zero at 648. If the first digit is a zero, the telecommunication station tone decoder then recognizes the call as an international one and will then query whether the next two digits are "11," the opening digits "011" representing a call outside of the United States and Canada by the North American dialing plan. If the digits following a first dialed zero are not "11," then a reorder tone is generated at 652. If the digits following a first dialed zero are indeed "11," then the operating system will obtain the country code as dialed in the subsequent digits and find the least cost communication medium and carrier at 656 in a manner described in greater detail below. If the first dialed digit is not a zero at 648, the decoder will then determine whether the first dialed digit is a one at 658. If the first dialed digit is not a one, a reorder tone to the appropriate telecommunication channel will be generated at 660. If the first dialed digit is a one at 658, the decoder then recognizes the call as an U.S. national one and will then query whether the next three digits are either "700," "800," or "900" at 662. If the digits following the first dialed one are either "700," "800," or "900," a reorder tone will be generated at 669 to prevent outgoing calls that begin "1-700," "1-800," or "1-900." If the question of 662 is responded to in the negative, the least cost communication medium and carrier is then determined.

The determination of the least cost service is now described. The interface of the present invention accomplishes least cost routing in two different steps. The interface first selects the least expensive communication medium that is available in the geographic area in which the ocean going vessel is located. If it is determined that satellite is the only communications medium available, the interface then selects the least expensive CES to provide international telephone gateway service to the country designated by the caller.

Figure 15A:
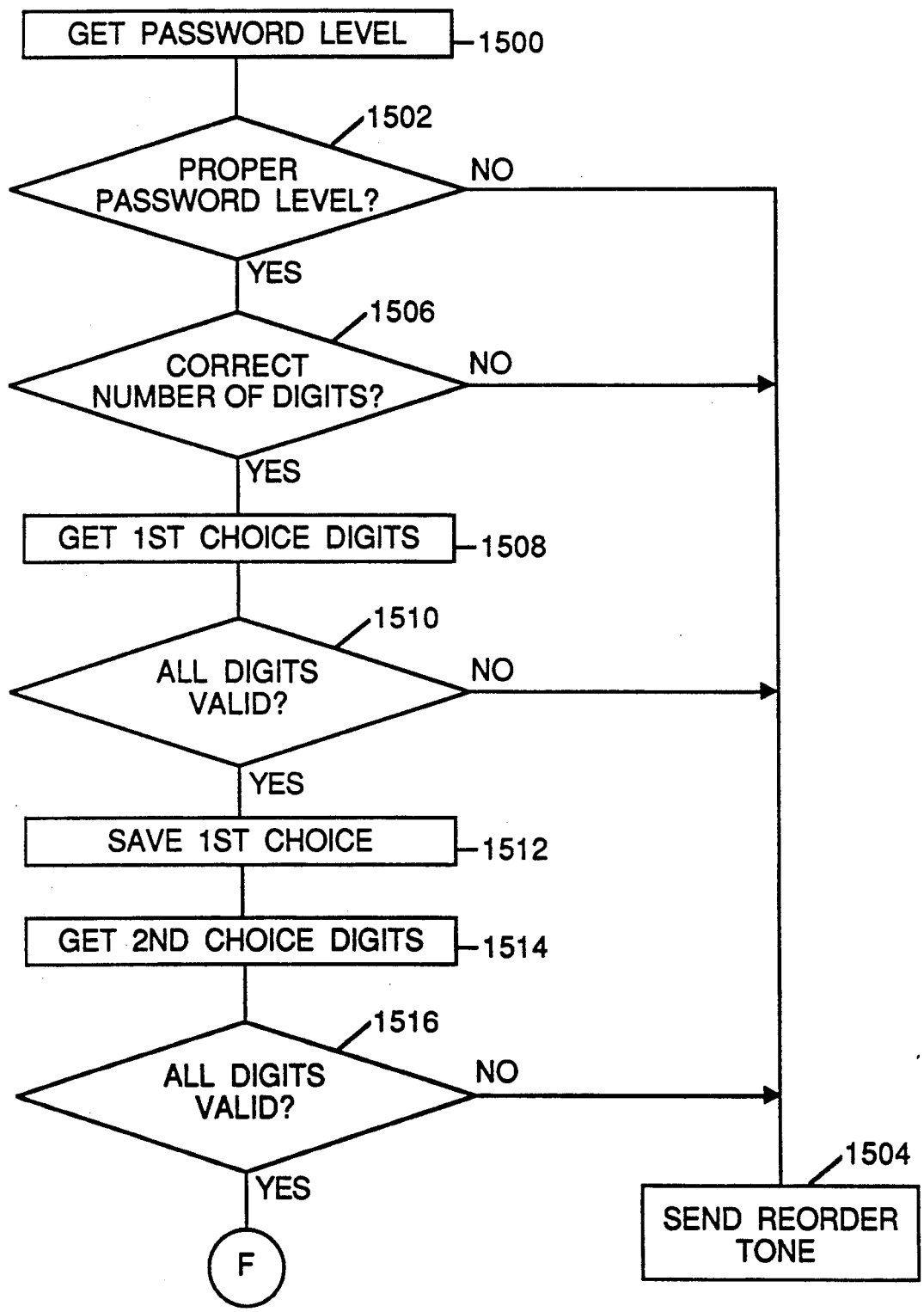
FIG. 15 is a flow chart detailing the setting of the channel routing sequence.
FIG. 15B is a continuation of FIG. 15A detailing the task of setting of the channel routing sequence.
Figure 15B:
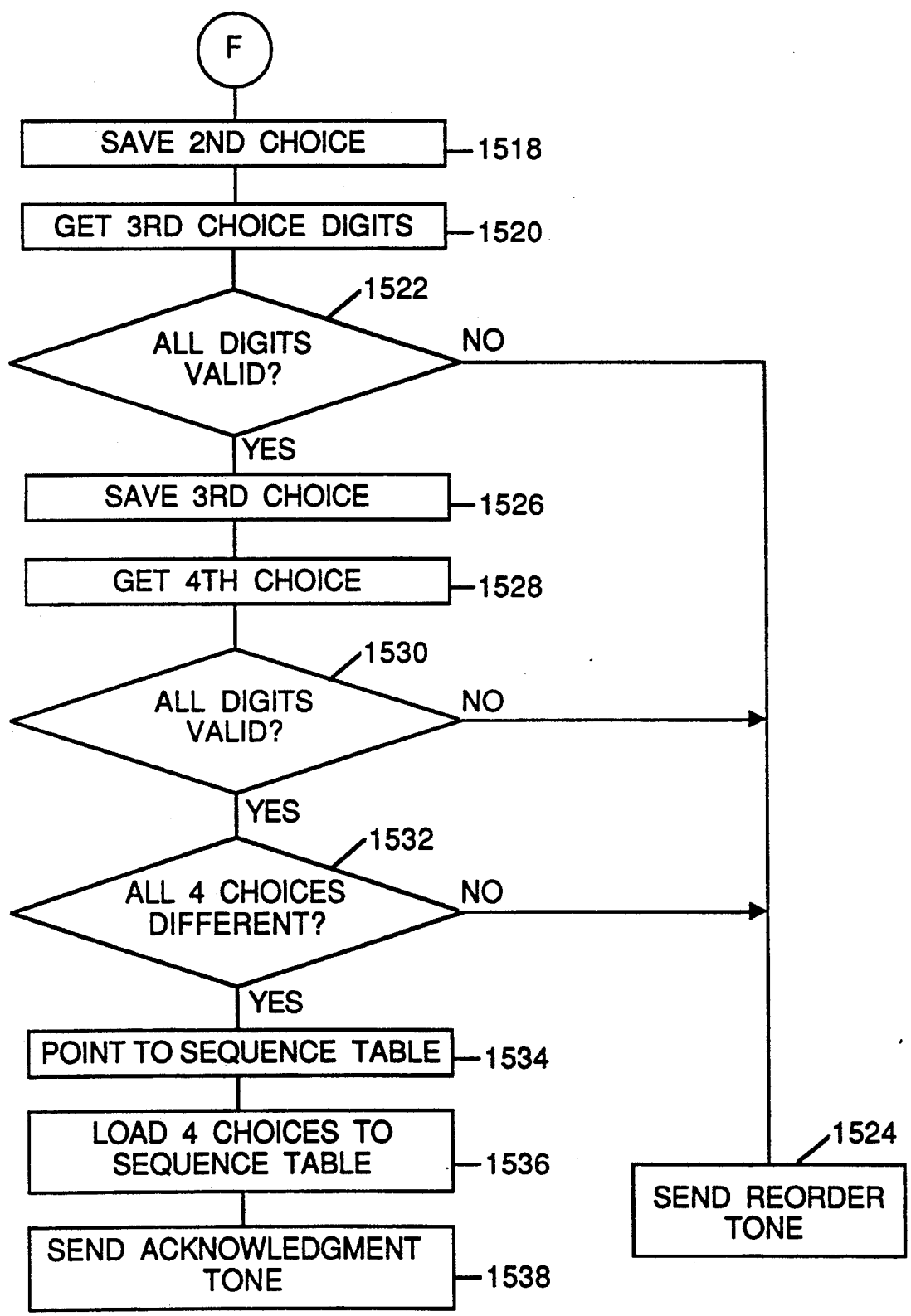

In order to select the least cost communication medium, the interface must be programmed during installation to recognize the available media and their respective connection to the communication channels, for example, port 1: satellite; port 2: cellular; port 3: land line; port 4: no connection. The setting of the trunk channels to reflect the type of communication terminal connected thereto is depicted below in FIGS. 16A and 16B and described in the text below that references these figures. The hierarchy of selection between the media is defaulted such that land lines are selected as a first choice, cellular lines as a second choice, and satellite communications third. The sequencing of the trunk channels to reflect this hierarchy is depicted in FIGS. 15A and 15B below and described in the text that references these figures below. The hierarchy can be changed during installation to reflect duplicate systems or additional communication media. The interface, upon placement of a call, selects the channel of least cost (first choice) off hook, and look for loop current and/or dial tone. If loop current is not detected, the interface on hooks this channel and try either another channel of the same media (as there could be two or more cellular or land lines) if available, or bring the channel off hook for the second choice. The interface continues this process until the channels that are of less cost than satellite are exhausted. If the interface then selects satellite, the interface selects the least expensive coast earth station. If no channels are available due to equipment malfunction or medium coverage is not present, the interface passes reorder tone back to the subscriber.

If the medium selected is via satellite, the interface interprets the country code selected by the caller in the dialing sequence and look through search tables to select the least expensive CES to route the call. The interface performs this routing by knowing its location (as programmed during installation and updated upon relocation of the vessel according to FIG. 11, below) and also knowing the available coast earth stations providing coverage in the region that the ocean going vessel is located. The interface also takes the time of day into consideration as certain coast earth stations have "off-peak" rates at varying times. The interface scans its search tables and selects the coast earth station having the least cost into the geographic zone which contains the selected country. If the selected CES is busy or not available the next least expensive CES is selected and this will alternate back and forth if for some reason they are both at maximum capacity (busied out). An override feature is provided to allow a caller to override least cost routing and select a preferred CES choice should they require that option.

In order to further explain the search tables, the Inmarsat satellite network is used as an example. The Inmarsat satellite system is divided up into three regions: Atlantic Ocean Region (AOR), Pacific Ocean Region (POR), and Indian Ocean Region (IOR). The AOR will be divided into the AOR East and AOR West in the fall of 1990, thereby making four ocean regions. Each of these ocean regions is defined by and serviced by a single geosynchronous satellite. Each ocean region has several coast earth stations that provide gateway services for telephone and telex communications into the international dial up network The rates charged by these coast earth stations vary both in CES service fees as well as additional "tail end" long distance charges.

In order to arrive at the tariff calculations, the world is divided into a plurality of geographic zones, similar to charge bands used by most international telephone service providers. Additionally, the countries having a coast earth station are assigned a band in themselves as in most cases this was the least cost access via satellite into that country. Each zone contains the international 1, 2, or 3 digit code assigned to a country as its calling "country code," for the countries grouped in that geographic zone. A rate is calculated, dependent on a coast earth stations published service charge and the additional tail end charges, for each CES to call into the various geographic zones. A plurality of tables are constructed to encompass both standard and off-peak rates. The tables are structured such that the least expensive CES resides at the top of the table and progressively more expensive coast earth stations towards the bottom. The calculations are done using a standard international currency, for example the "Gold Franc," which is the industry standard for maritime communication charges in most instances.

FIG. 6C illustrates the above-described least cost routing as performed by the interface of the present invention in flowchart form. A determination is first made whether outgoing telephone calls are enabled at 656. The setting of the interface to enable or disable outgoing telephone calls is described below in FIG. 12. If an outgoing call is not enabled through the interface, a reorder tone is sent to the subscriber at 657. If an outgoing call is enabled at 656, a query is then made as to whether there is a trunk channel that is dedicated to a land line at 658. If there is a trunk channel dedicated to a land line at 658, then a determination is made as to whether a land line is available (i.e., whether the ocean-going vessel is docked and plugged into a land line) at 659. If the land line is available at 659, then the call is placed on the land line at 660. If there is not a trunk channel dedicated to a land line at 658 or the land line is not available at 659, a query is then made as to whether there is a trunk channel that is dedicated to a cellular line at 661. If there is a trunk channel dedicated to a cellular line at 661, then a determination is made as to whether a cellular line is available (i.e., whether the oceangoing vessel is in range of a cellular network) at 662. If the cellular line is available at 662, then the call is placed on the cellular line at 663. If there is not a trunk channel dedicated to a cellular line at 661 or the cellular line is not available at 662, a query is then made as to whether there is a trunk channel dedicated to a satellite line at 664. If there is not a trunk channel dedicated to a satellite line at 664, a busy tone is sent to the subscriber at 665. If there is a trunk channel dedicated to a satellite line at 664, then a determination is made as to whether a satellite line is available at 665. If the satellite line is available at 665, then a determination is made as to whether the least cost routing has been enabled at 666, explained below in FIG. 14 and referenced text. If the least cost routing is not on at 666, then the call is routed according to a preselected satellite carrier and the call is placed on the satellite line at 668. If the least cost routing is on at 666, then the least cost CES is determined at 667 by examining the country code dialed and the ocean region that the oceangoing vessel is located and referring to the lookup table. The call is then placed on the satellite line at 668.

Figure 6D:
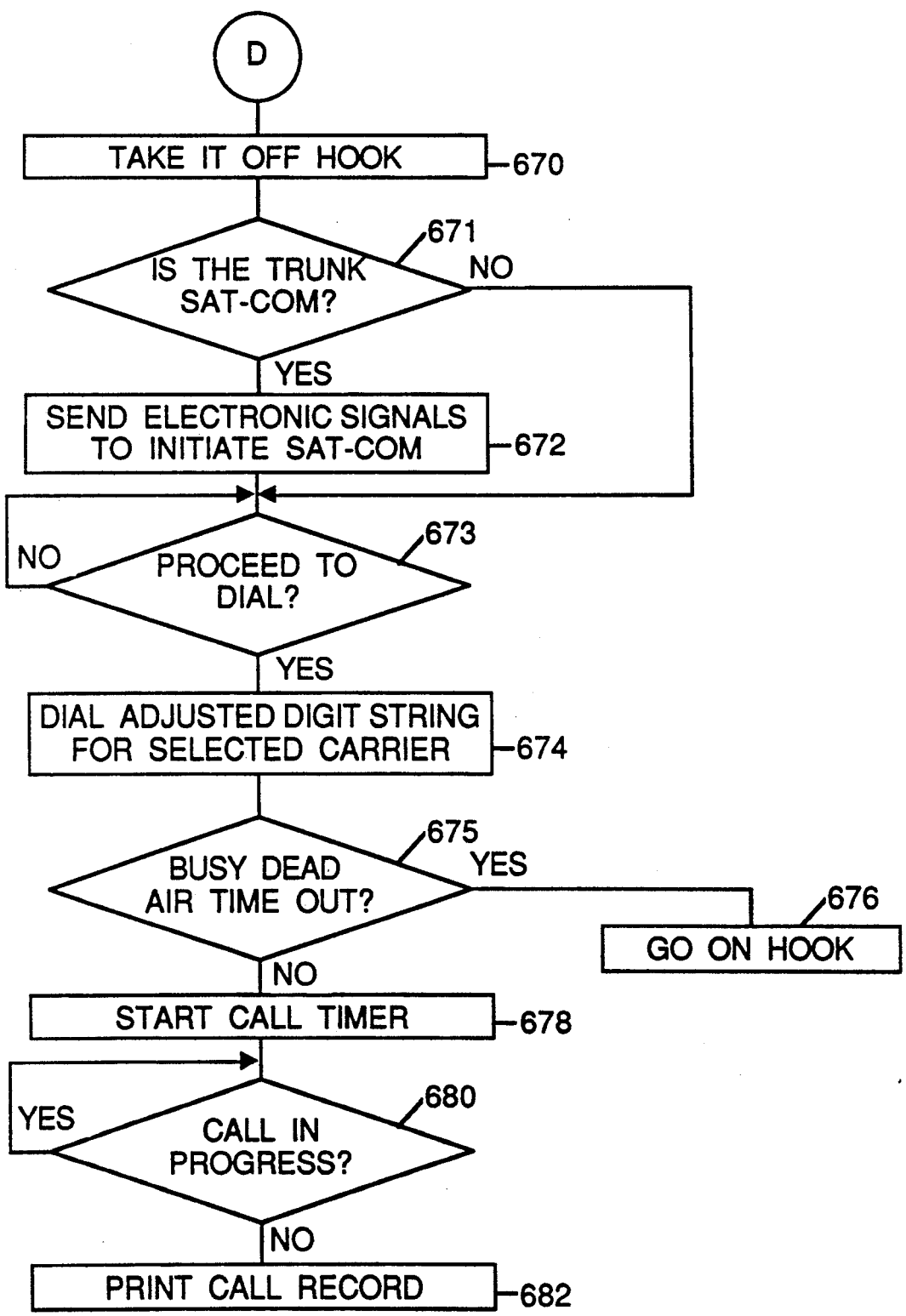
FIG. 6D is a continuation of 6C detailing the telecommunication station tone decoder, and specifically the redialing and call supervision features.

FIG. 6D is a continuation of the telecommunication station tone decoder. Upon determination of the least cost medium above, then the trunk dedicated to that medium is taken off hook at 670. A determination is next made as to whether the trunk that has been taken off hook at 670 is dedicated to satellite communications at 671. If the trunk taken off hook is a satellite trunk, then the interface sends an appropriate string of electronic command signals at 672 to the communication terminal that informs the terminal of the selected coast earth station and initiates a request for a voice channel. The string of electronic command signals sent to the terminal will vary according to the manufacturer of the terminal and the interface is programmed accordingly. Upon completion of the sending of the string of electronic signals at 672, or if the trunk to which the call is being routed is not dedicated to satellite communications at 671, a determination is then made whether a "proceed to dial" tone from the carrier has been received at 673. If no "proceed to dial" tone has been received at 673, then decoder will continue to check the line. Upon receipt of the "proceed to dial" tone from the communication carrier, the interface then redials an adjusted digit string that adds or strips digits to the dialed telephone number so that the call is understood by the selected carrier, as the different carriers require different dialing prefixes in order to complete the call. The interface next supervises call progress and determines whether there is a sustained period of busy signal or dead air at 675. Indicia of call progress such as busy signal, ring no answer, and dead air are detected by filtering the audio pass band through an array of filters of different frequencies to detect those different events. The filtering process is shown below in FIG. 7B. If a preselected period of time of busy signal or dead air is detected at 675, the telephone system goes on hook at 676 and the call is terminated. If there is no such period of busy signal or dead air, a call timer is started at 678 and the call is continually monitored at 680 to determine whether it remains in progress. If the call is terminated, a detailed call record is printed out at 682. The call record may include date, time, cabin number (if through a PABX), trunk channel and/or communication medium or network, dialed number, duration, and call progress.

Figure 7A:
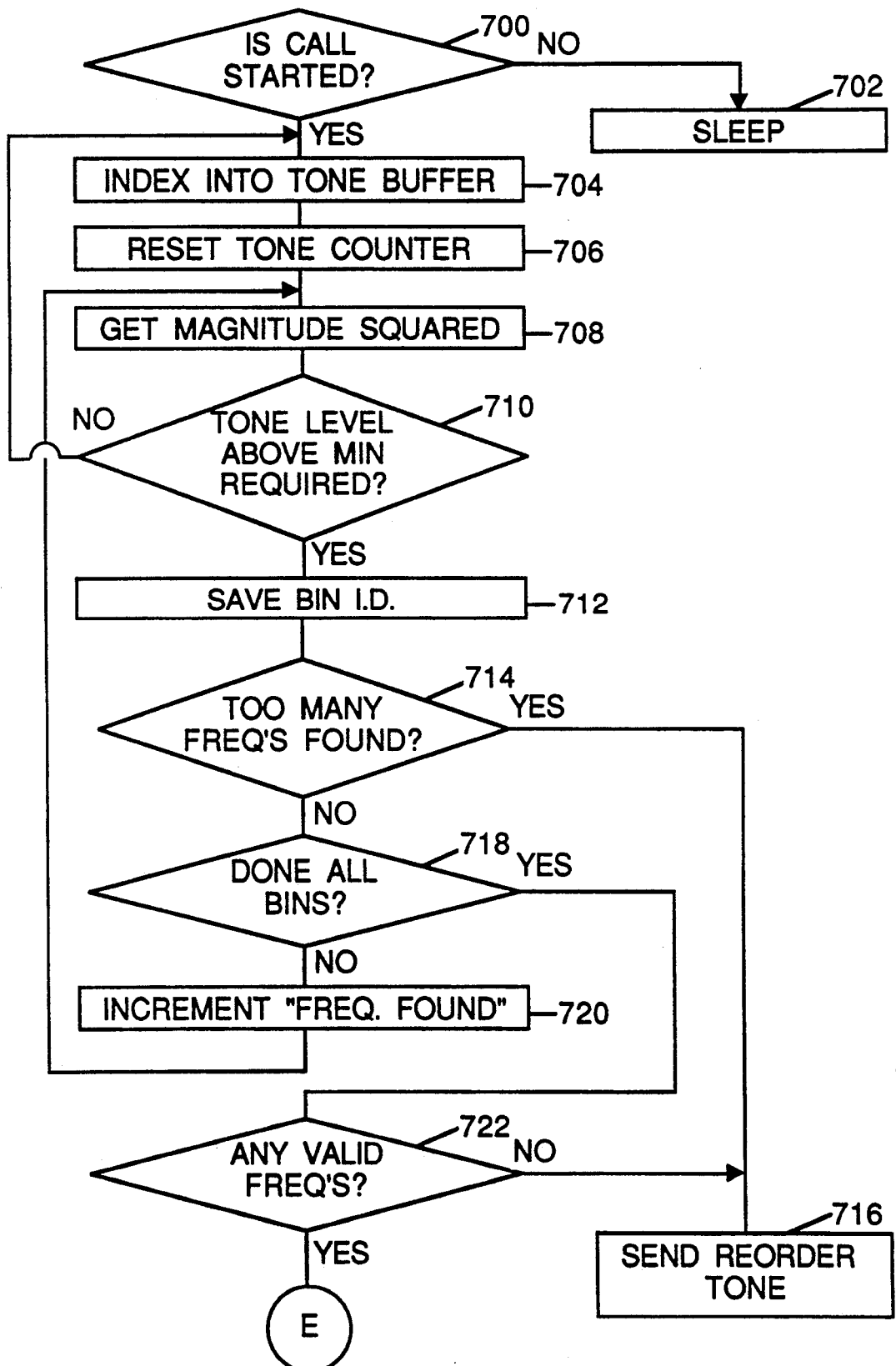
FIG. 7A is a flow chart detailing the communication terminal tone decoder driver.
Figure 7B:
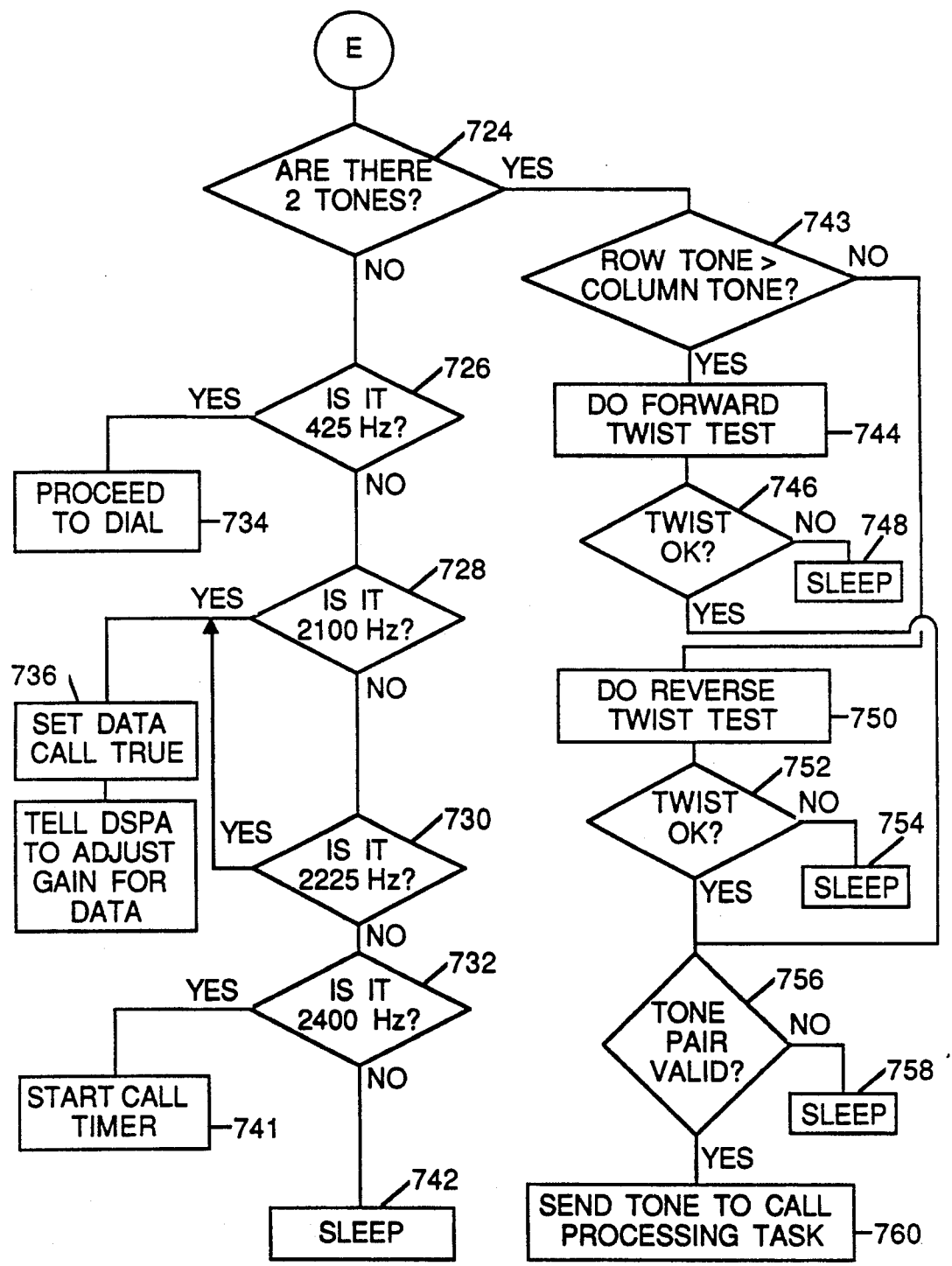
FIG. 7B is a continuation of FIG. 7A detailing the communication terminal tone decoder.

FIGS. 7A and 7B represent the task of decoding and driving the communication terminal. At 700, a determination is made whether a call has been started on a particular trunk channel. If no call has been started on that channel, the operating system will go to "sleep" at 702 with respect to that channel until the system returns from having reviewed the other trunk channels. If a call has been started at 702, the system indexes into a tone buffer at 704 and resets a tone counter at 706. The communication terminal decoder/driver then obtains the magnitude of a tone received from the communication terminal at 708 and determines whether the tone level is of a sufficient preselected magnitude at 710. If the magnitude is not above a minimum level required at 710, then the tone is regarded as noise and the system loops to again index the tone buffer at 704. If the tone level is above the minimum level at 710, then the communication terminal tone decoder driver sorts the tone through a number of bins to identify whether the tone is actually a single frequency tone or a multiple frequency tone and of what frequencies the tone is composed. If a tone is discernable as fitting within a certain bin, or filter range, the identification of the tone is saved at 712. If the tone is a multiple tone and composed of more than two frequencies then a reorder tone is sent to the communication terminal at 716. The communication terminal tone decoder/driver then checks to determine whether the tone has been processed through all of the bins at 718. If not all of the bins have been checked, then the communication terminal tone decoder/driver then increments to the next bin at 720 and iterates the procedure, beginning at 708 to obtain the magnitude of the tones. If all of the bins have been checked at 718, the communication terminal tone decoder/driver checks whether there are valid frequencies in the tone received from the communication terminal at 722. If there are no valid frequencies, a reorder tone is generated at 716. If there are valid frequencies, then the communication terminal tone decoder driver then determines whether there are two tones at 724. If there are not two tones, then the communication terminal tone decoder driver checks whether the single tone is 425 Hz at 726, 2100 Hz at 728, 2225 Hz at 730, or 2400 Hz at 732. If the tone is 425 Hz, then the tone is identified as a signal from a satellite carrier to prompt the interface to proceed to dial the appropriate sequence of digits at 734 to connect the call. This is the "proceed to dial" tone represented at 670 in FIG. 6D that prompts the telecommunication station tone decoder to dial the digits in an attempt to connect the call. If the tone is either of 2100 Hz or 2225 Hz, the tone decoder recognizes such frequencies at 736 as indicative of a modem frequency and as a call conveying data rather than voice. When the call is identified as one that is transmitting data at 736, the first digital signal processor 24 is informed at 738 in order to adjust the gain for data transmission. If the tone is 2400 Hz, the tone decoder recognizes a signal indicative that the call has been answered and begins the call timer at 741. If the tone is not 400 Hz, 425 Hz, 2100 Hz, 2225 Hz, or 2400 Hz, then the tone decoder goes to "sleep" at 742 with respect to the channel being scanned. If it is determined that the tone is a dual-tone multifrequency (DTMF) tone at 724, then a determination is made at 743 whether the row tone is greater than the column tone. If the row tone is greater than the column tone, then a forward twist test is performed at 744. If the result of the forward twist test is unsatisfactory, then the communication terminal decoder driver will go to "sleep" at 748. If the row tone is not greater than the column tone, then a reverse twist test is performed at 750. If the result of the reverse twist test is unsatisfactory, then the communication terminal decoder driver will go to "sleep" at 754. If the result of the forward twist test is satisfactory at 746 or the reverse twist test is satisfactory at 752, then a determination is made whether the tone pair is valid at 756. If it is determined that the tone pair is not valid at 756, then the communication terminal decoder driver will go to "sleep" at 758. If it is determined that the tone pair is valid at 756, then the tone is sent to the call processing task at 760. Indicia of call progress such as busy signals, reorder, dial tone, and acknowledgment tones are DTMF tones and are detected according to the above steps 743-760.

Figure 8:
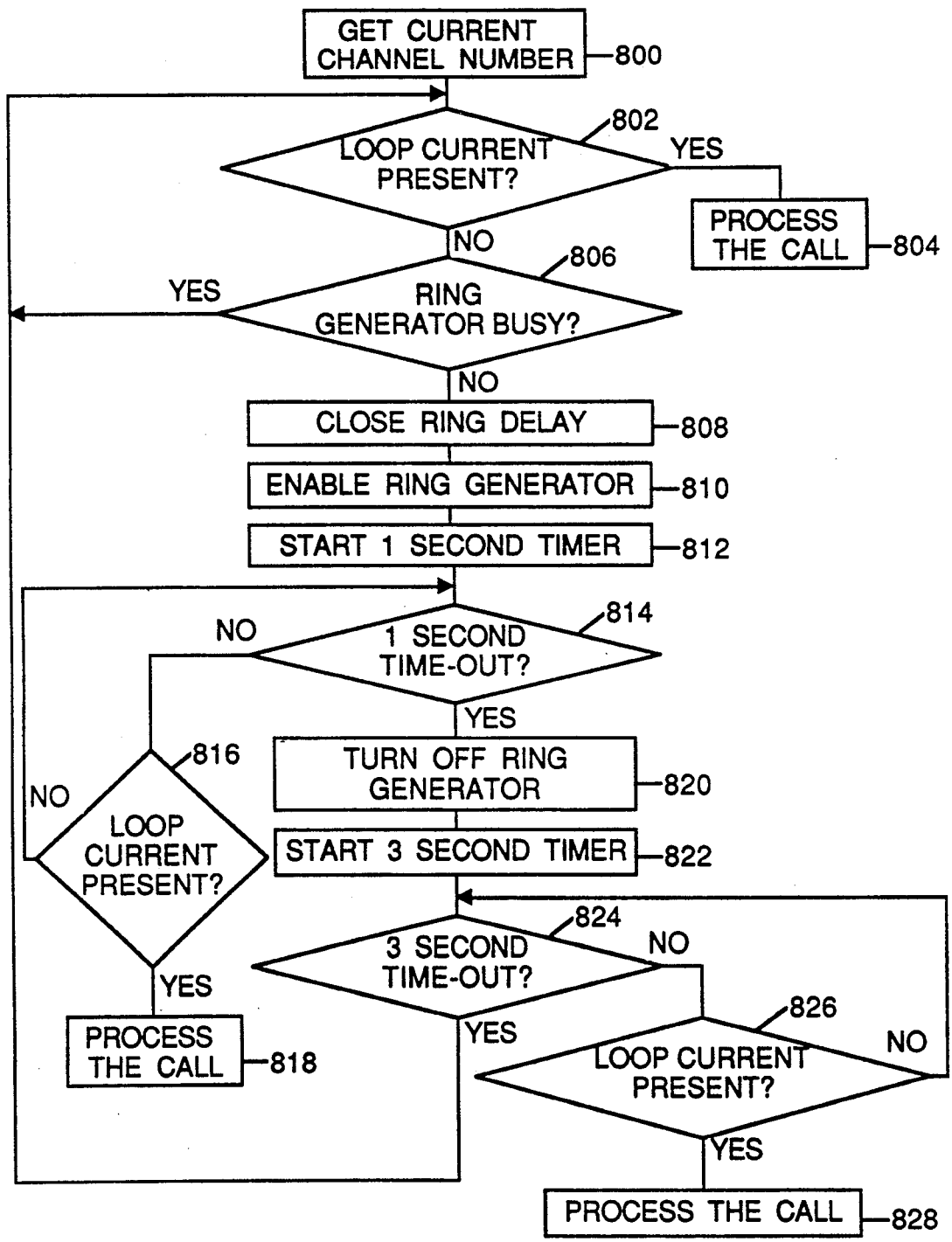
FIG. 8 is a flow chart detailing the ringer subroutine.

FIG. 8 is the ringer subroutine for ring generation in the telecommunication devices at one of the station channels upon incidence of an incoming call. The current channel is obtained at 800 and then it is determined whether loop current is present at 802. If loop current is determined to be present, then the call is processed at 804. If loop current is not present at 802, then the ringer subroutine determines whether the ring generator 94 is busy at 806. If the ring generator 94 is not busy at 806, then the ringer subroutine returns to 802 to determine whether loop current is present. If the ring generator is not busy at 806, then a ring relay is closed at 808, the ring generator 94 is enabled at 810 to cause ringing of the subscriber telephone or telecommunication station, and a one second timer is started at 812. The ringer subroutine then determines whether the one second timer has lapsed at 814. If the timer has not lapsed at 814, then the determination is made whether loop current is present at 816. If loop current is present at 816, then the call is processed at 818. If loop current is not present at 816, the ringer subroutine returns to again determine at 814 whether the one second timer has lapsed. If the one second timer has lapsed at 814, then the ring generator is turned off at 820 and the telecommunication station has completed a single ring and a three second timer is started at 822 to begin a period of silence between rings. A determination is then made at 824 as to whether or not the three second timer has lapsed. If the three second timer has lapsed at 824, then the ringer subroutine returns to determine whether loop current is present at 802. If the three second timer has not lapsed at 824, then a determination is made as to whether loop current is present at 826. If loop current is not present at 826, then the subroutine returns to determine whether the three second timer has lapsed at 824. If loop current is present at 826, then the call is processed at 828.

Figure 9:
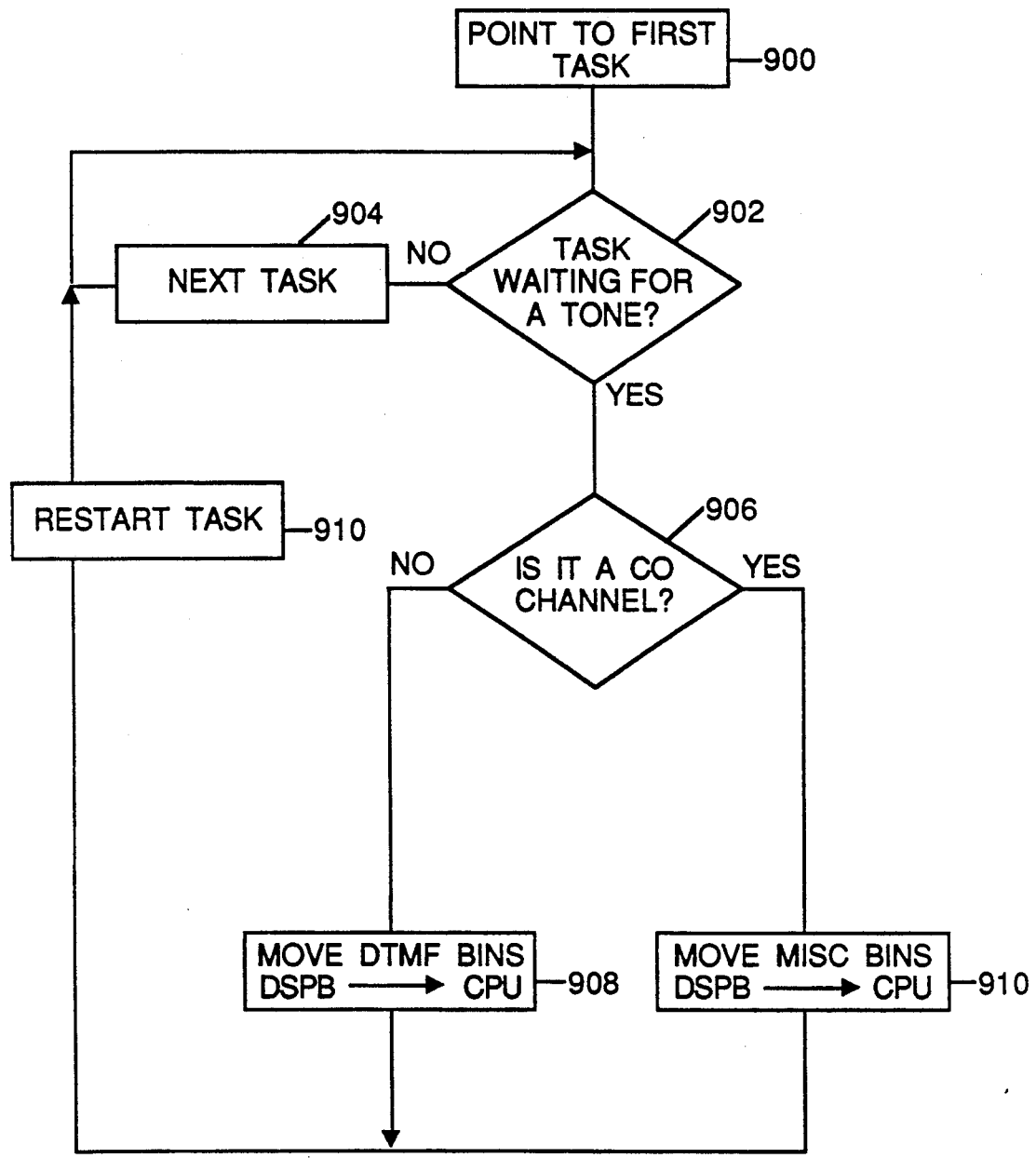
FIG. 9 is a flow chart detailing the digital signal processor service routine.

FIG. 9 is a digital signal processor interrupt service routine and establishes a pattern for detecting of tones within the channels for the telecommunication stations and the carrier trunks. At 900, the first task is scanned. A determination is then made at 902 as to whether the task is waiting for a tone. If no tone is being awaited for the first task, then the digital signal processor interrupt service routine increments to the next task at 904 and repeats the determination at 902 as to whether a tone is being awaited. If the respective task is awaiting a tone at 902, the determination is next made at 906 as to whether the tone originates from a trunk channel. If it is not a trunk channel, but rather a station channel, then the DTMF bins are moved from the digital signal processor 26 to the CPU 22 at 908. The routine next restarts the task at 910 and returns to 902 to determine whether the task is awaiting a tone. If the determination at 906 is that it is a trunk channel, then the bins are moved from the digital signal processor 26 to the CPU 22 at 910. The routine next restarts the task at 910 and returns to 902 to determine whether the task is awaiting a tone.

Figure 10:
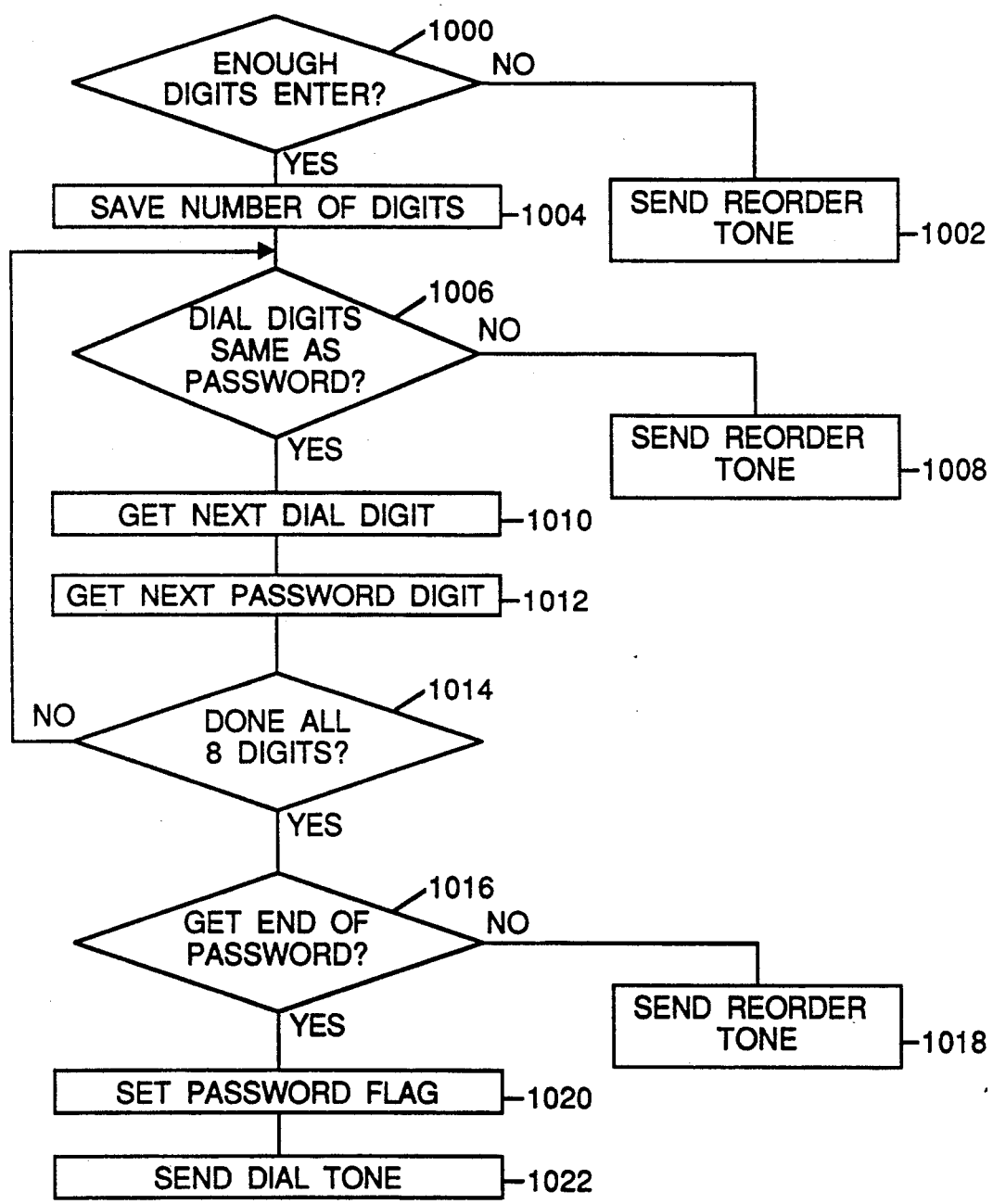
FIG. 10 is a flow chart detailing the password entry.

FIG. 10 represents a routine for the task of password entry through a telecommunication station. At 1000, a determination is made as to whether enough digits have been entered as a password. If not enough digits have been entered at 1000, then a reorder tone is sent at 1002. If enough digits have been entered at 1000, then the digits are saved at 1004 and compared to the password digits at 1006. If the dialed digits are not the same as the password at 1006, then a reorder tone is sent at 1008. If the dialed digits are the same as the password at 1006, then the next dialed digit is obtained at 1010 and the next password digit is obtained at 1012. A determination is then made as to whether or not all of the digits of the password have been compared at 1014. If not all of the digits have been compared at 1014, then the password entry routine returns to 1006 to compare the next digit in the password. When all of the eight digits have been compared to the password and match, a determination is made at 1014 as to whether the end of the password has been received. If not, a reorder tone is sent at 1016. If the end of the password has been received at 1014, then the password or flag is set at 1018 and a dial tone is sent to the subscriber at 1020.

Figure 11:
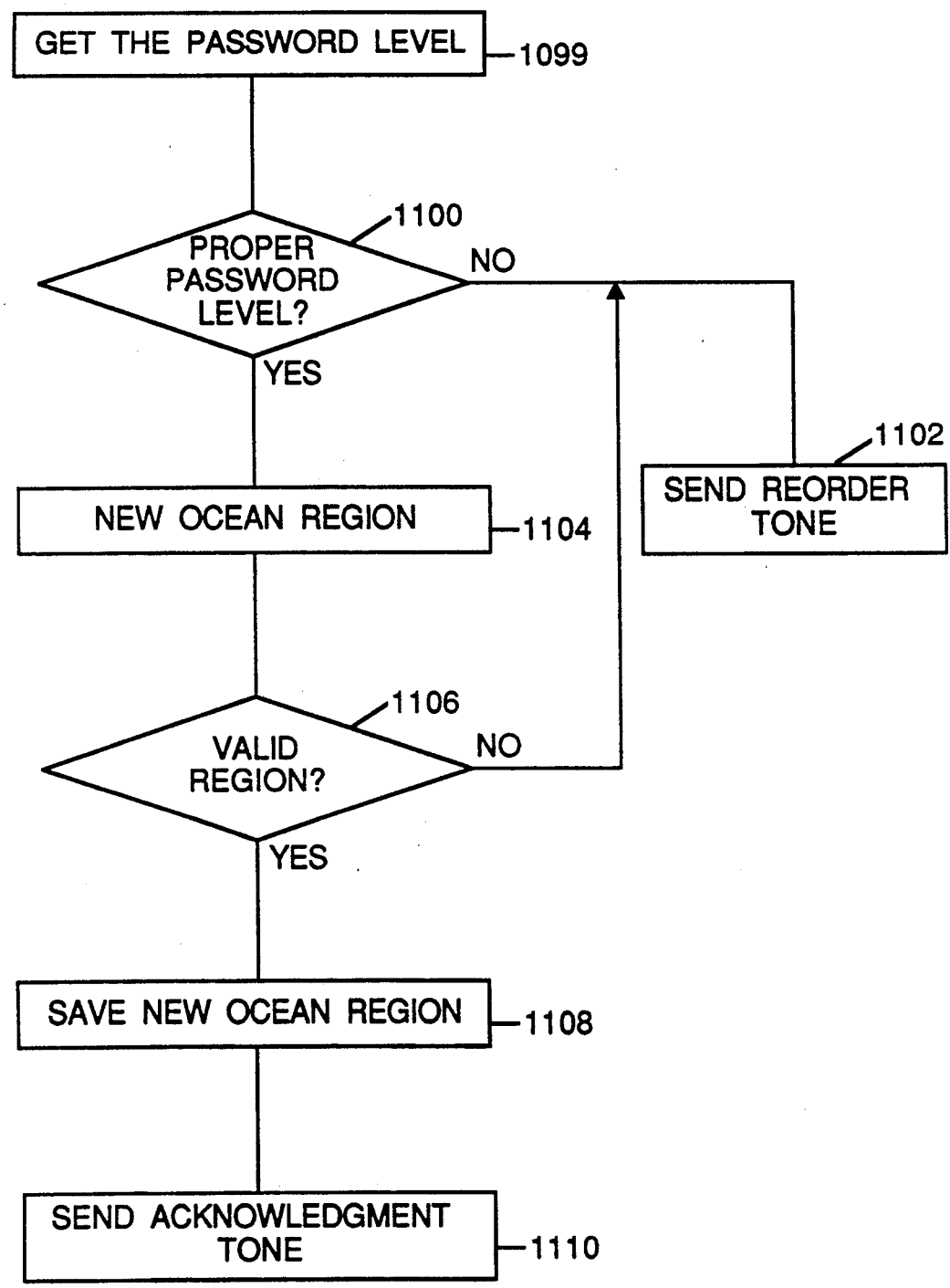
FIG. 11 is a flow chart detailing the setting of the current ocean region.

FIG. 11 shows the steps in the task of setting the current ocean region in which the oceangoing vessel is situated. The proper password and ocean region digit must be entered in a sequence of DTMF digits for purposes of determining the appropriate least cost route. Upon obtaining the password and ocean region digit at 1099, it is determined at 1100 whether the password is proper according to the steps of FIG. 10. If the password is not proper, a reorder tone is sent to the subscriber at 1102. The ocean region is extracted from the entered sequence at 1104. A determination is next made as to whether the entered region is valid at 1106. If the region is not valid, then a reorder tone is sent to the subscriber at 1102. If the region is valid at 1106, then the new ocean region is saved at 1108 and an acknowledgment tone is sent to the subscriber at 1110.

Figure 12:
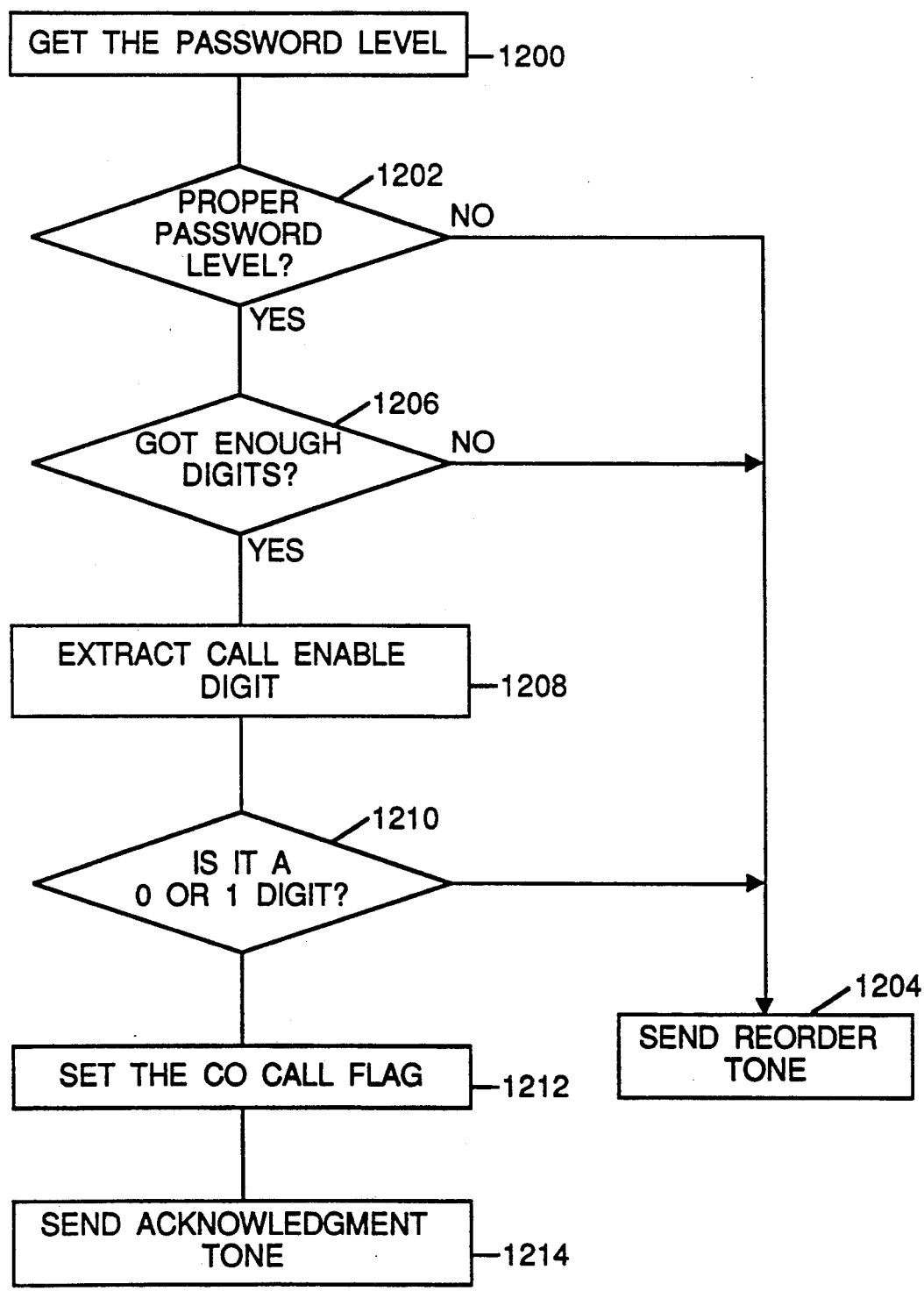
FIG. 12 is a flow chart detailing the setting to allow outgoing calls through the trunks.

FIG. 12 shows the steps in the task of enabling or disabling outgoing telephone calls through the interface. The proper password and call enable digit must be entered in a sequence of DTMF digits. Upon obtaining the password at 1200, it is determined at 1202 whether the password is proper according to the steps of FIG. 10. If the password is not proper, a reorder tone is sent to the subscriber at 1204. If the password is proper, a determination is then made as to whether there are enough digits at 1206. If there are not enough digits, a reorder tone is sent to the subscriber at 1204. If there are enough digits, then the call enable digit is extracted at 1208. For the case herein described a "one" may be used to enable the outgoing telephone calls through the interface and a "zero" may be used to prevent the outgoing telephone calls through the interface. At 1210, a determination is made as to whether the call enable digit is a zero or a one. If neither a zero nor a one is entered, then a reorder tone is sent to the subscriber at 1204. If the digit entered is either a zero or a one, then the call flag is set to either enable or prevent outgoing calls at 1212 and an acknowledgment tone is sent to the subscriber at 1214.

Figure 13:
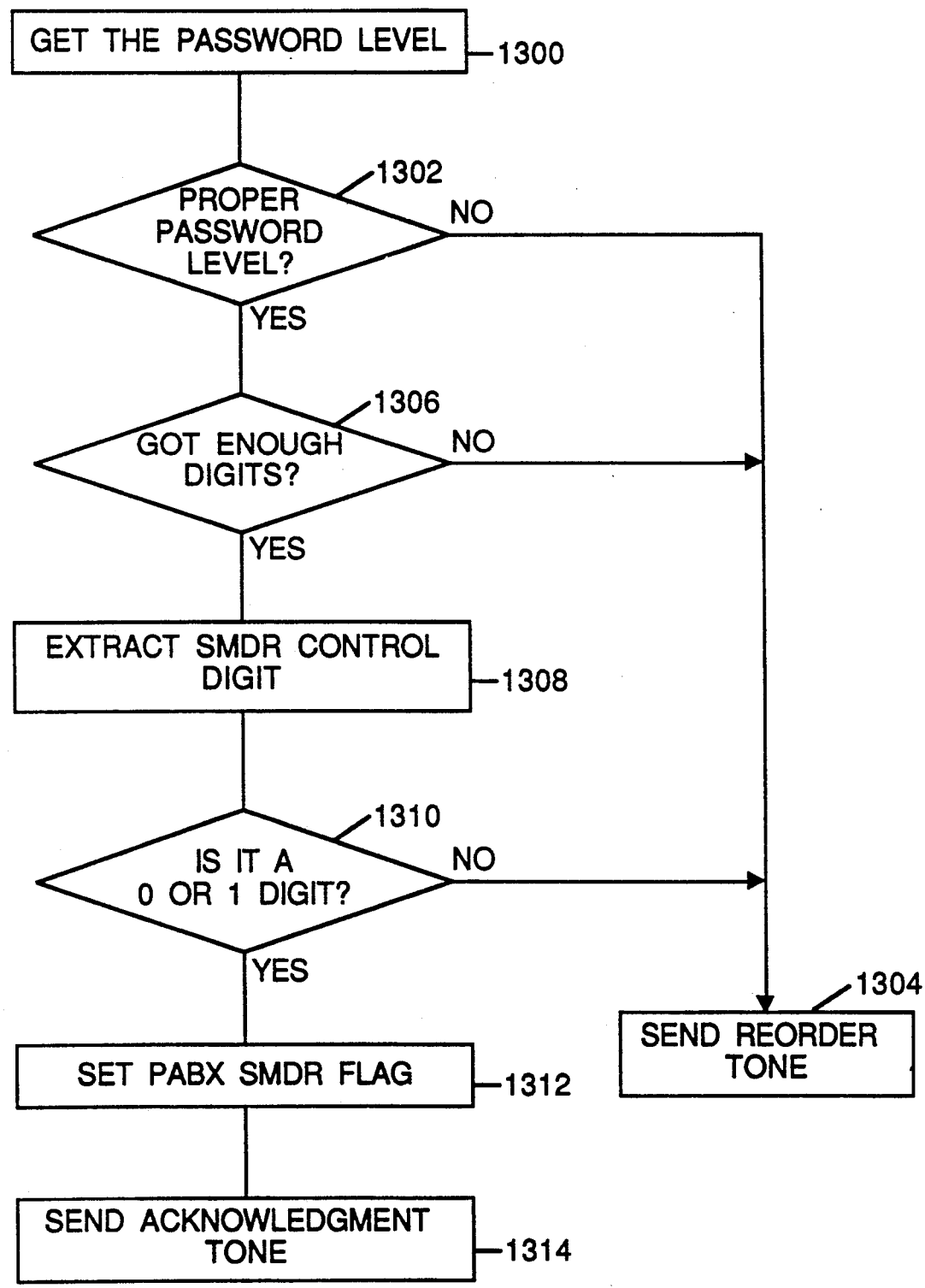
FIG. 13 is a flow chart detailing the setting of the PABX SMDR interface on/off.

FIG. 13 shows the steps in the task of setting the PABX SMDR interface on or off. The proper password and SMDR control digit must be entered in a sequence of DTMF digits. Upon obtaining the password at 1300, it is determined at 1302 whether the password is proper according to the steps of FIG. 10. If the password is not proper, a reorder tone is sent to the subscriber at 1304. If the password is proper, a determination is then made as to whether there are enough digits at 1306. If there are not enough digits, a reorder tone is sent to the subscriber at 1304. If there are enough digits, then the SMDR control digit is extracted at 1308. For the case herein described, a "one" may be used to enable the PABX SMDR interface and a "zero" may be used to inhibit the PABX SMDR interface. At 1310, a determination is made as to whether the PABX SMDR enable digit is a zero or a one. If neither a zero nor a one is entered, then a reorder tone is sent to the subscriber at 1304. If the digit entered is either a zero or a one, then the call flag is set to enable or inhibit the PABX SMDR at 1312 and an acknowledgment tone is sent to the subscriber at 1314.

Figure 14:
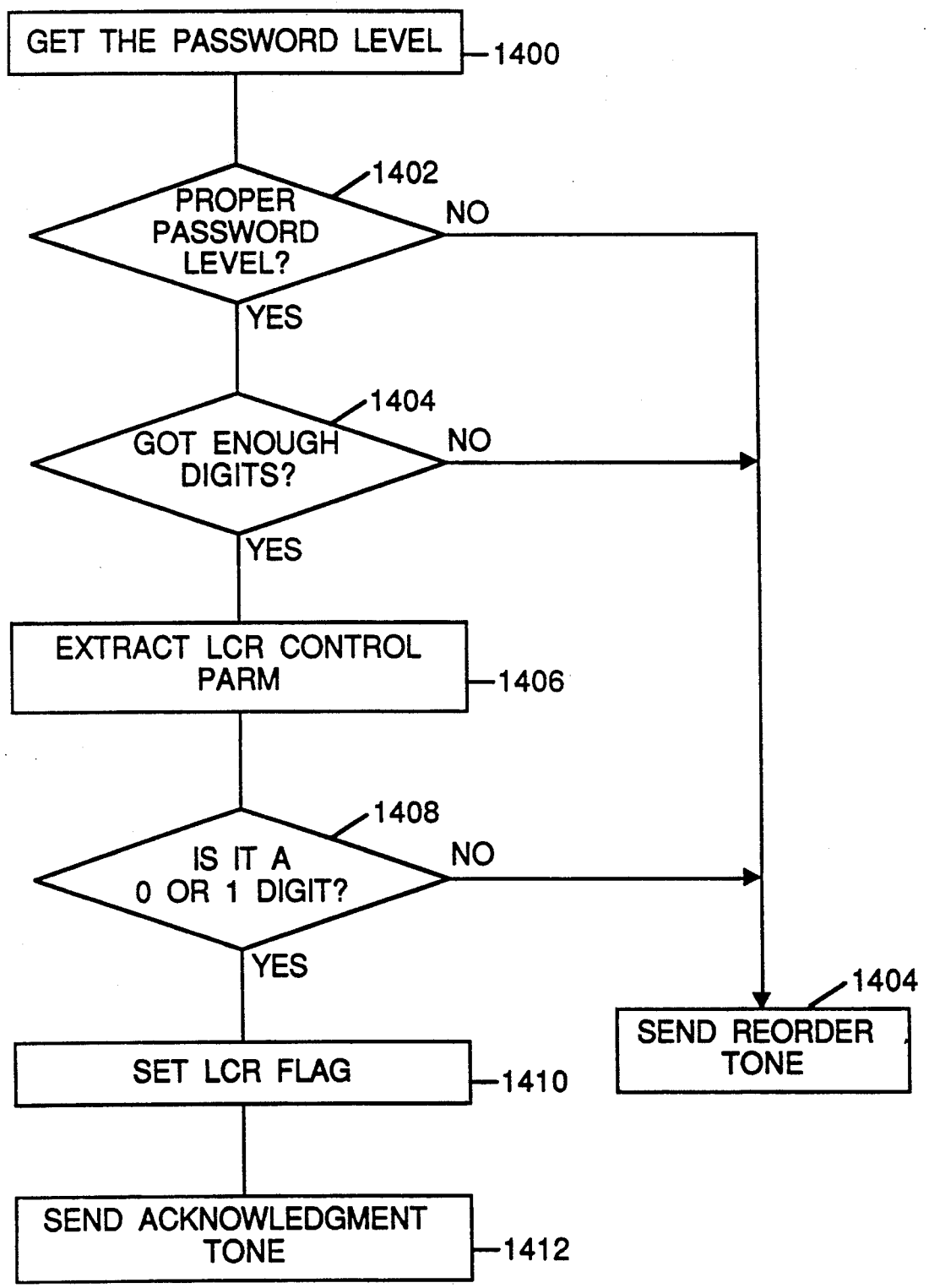
FIG. 14 is a flow chart detailing the setting of the least cost routing on/off.

FIG. 14 shows the steps in the task of setting the least cost routing on or off. The proper password and least cost routing control digit must be entered in a sequence of DTMF digits. Upon obtaining the password at 1400, it is determined at 1402 whether the password is proper according to the steps of FIG. 10. If the password is not proper, a reorder tone is sent to the subscriber at 1404. If the password is proper, a determination is then made as to whether or not there are enough digits at 1406. If there are not enough digits, a reorder tone is sent to the subscriber at 1404. If there are enough digits, then the least cost routing control digit is extracted at 1408. For the case herein described, a "one" may be used to enable the least cost routing and a "zero" may be used to inhibit the least cost routing through the interface. At 1410, a determination is made as to whether the least cost routing enable digit is a zero or a one. If neither a zero nor a one is entered, then a reorder tone is sent to the subscriber at 1404. If the digit entered is either a zero or a one, then the least cost routing flag is set to either enable or inhibit least cost routing at 1412 and an acknowledgment tone is sent to the subscriber at 1414.

FIGS. 15A and 15B show the steps in the task of setting the channel routing sequence through the interface. The proper password must be entered in a sequence of DTMF digits. Upon obtaining the password at 1500, it is determined at 1502 whether the password is proper according to the steps of FIG. 10. If the password is not proper, a reorder tone is sent to the subscriber at 1504. If the password is proper, a determination is then made as to whether there are a correct number of digits at 1506. If there are not a correct number of digits at 1506, a reorder tone is sent to the subscriber at 1504. If there are a correct number of digits, then digits representing the preferred channel are entered at 1508. The preferred channel is attached to the medium of least cost. At 1510, a determination is made to determine if the entered digits are valid. If the digits are not valid, a reorder tone is sent to the subscriber at 1504. If the entered digits are determined valid at 1510, then the preferred channel is saved at 1512. The digits representing the channel of second choice are entered at 1514. At 1516, a determination is made to determine if the entered digits are valid. If the digits are not valid, a reorder tone is sent to the subscriber at 1504. If the entered digits for the second choice are valid at 1516, then the second choice channel is saved at 1518. The digits representing the channel of third choice are entered at 1520. At 1522, a determination is made to determine if the entered digits for the third choice are valid. If the digits are not valid, a reorder tone is sent to the subscriber at 1524. If the entered digits for the third choice are valid at 1530, then the third choice channel is saved at 1526. The digits representing a channel of fourth choice is entered at 1528. At 1530, a determination is made to determine if the entered digits for the fourth choice are valid. If the digits are not valid, a reorder tone is sent to the subscriber at 1524. If the entered digits for the fourth choice are valid at 1530, then the fourth choice is saved at 1531. A determination is then made as to whether all of the four choice are different at 1532. If the four choices are not different, a reorder tone is sent to the subscriber at 1524. If the four choices are different, then a sequence table is indexed at 1534, the four choices are loaded into the sequence table at 1536, and an acknowledgment tone is sent to the subscriber at 1538.

Figure 16A:
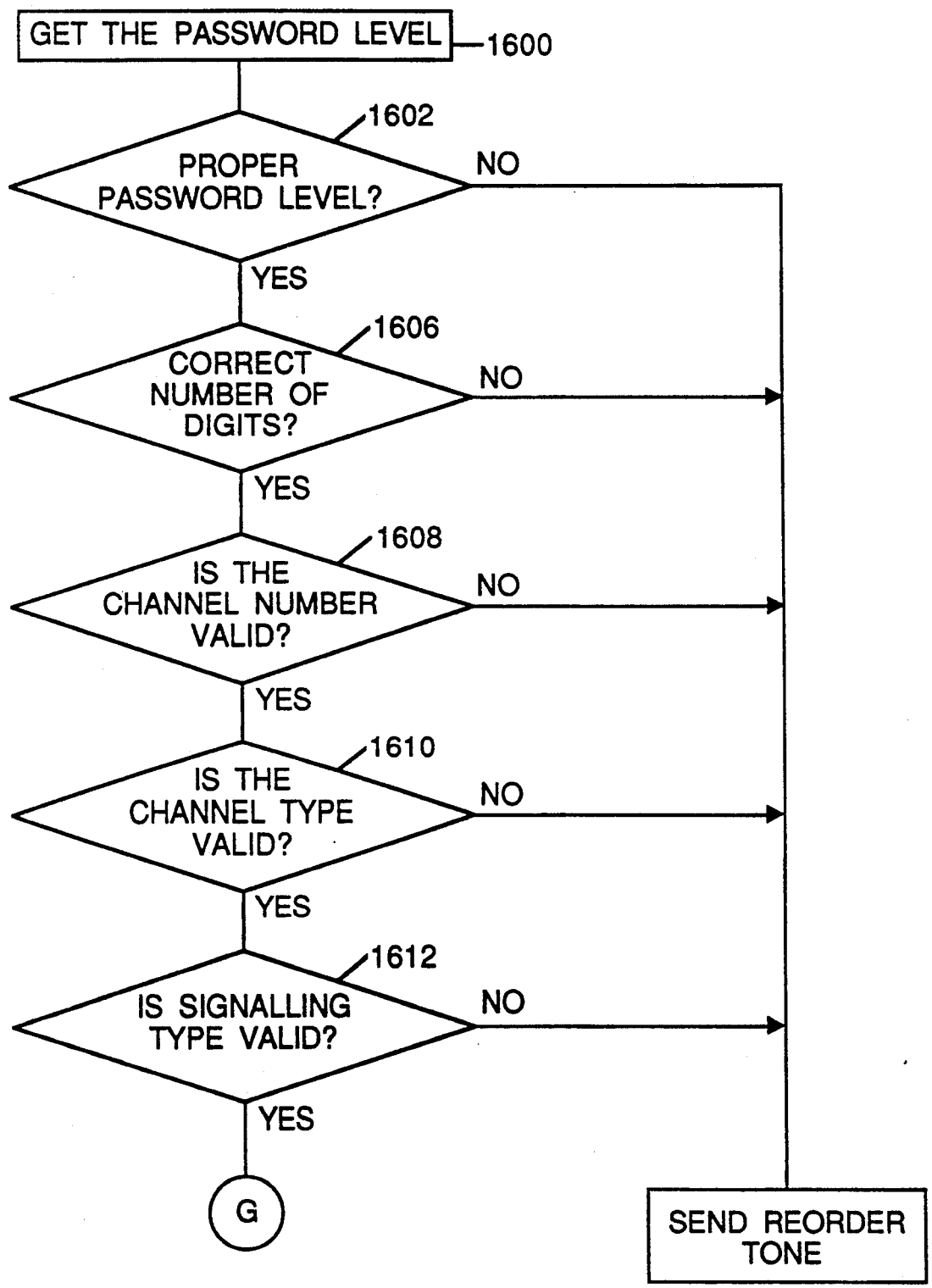
FIG. 16A is a flow chart detailing the setting of the trunk channel parameters.
Figure 16B:
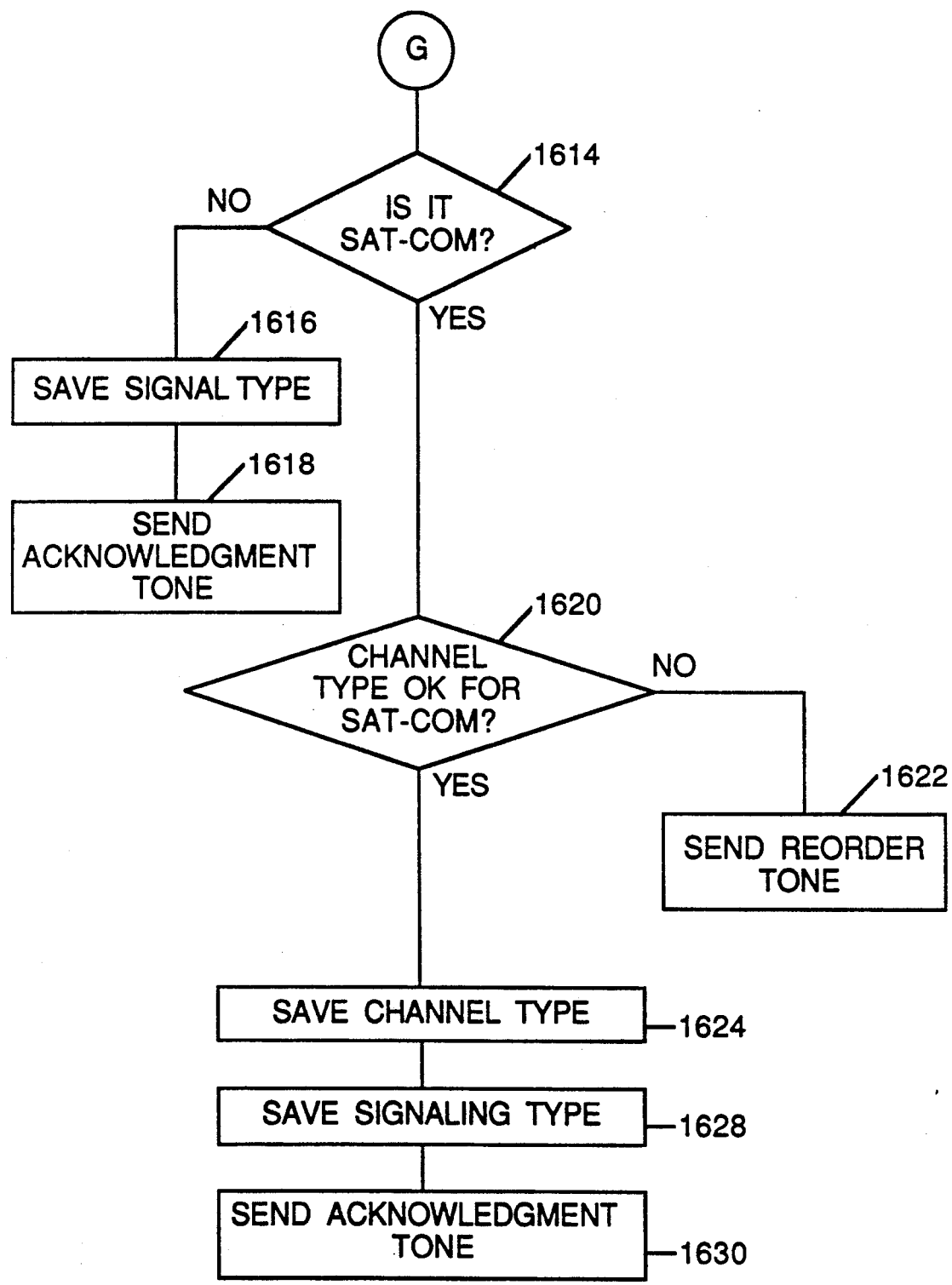
FIG. 16B is a continuation of FIG. 16A detailing the setting of the trunk channel parameters.

FIGS. 16A and 16B show the steps in the task of setting the trunk channel parameters, that is, setting the trunk channels to reflect the type of medium that is connected thereto. The proper password, channel number, channel type, and signaling type for a given channel must be entered in a sequence of DTMF digits. Upon obtaining the password at 1600, it is determined at 1602 whether the password is proper according to the steps of FIG. 10. If the password is not proper, a reorder tone is sent to the subscriber at 1604. If the password is proper, a determination 10 is then made as to whether the correct number of digits has been entered at 1606. If the correct number of digits has not been entered at 1606, a reorder tone is sent to the subscriber at 1604. If the correct number of digits has been entered at 1606, a determination is then made as to whether the channel number selected is valid at 1608. If the selected channel number is not valid, a reorder tone is sent to the subscriber at 1604. If the selected channel number is valid, a determination is then made as to whether the channel type (e.g., satellite, cellular, or land line) is valid at 1610. If the channel type is not valid, a reorder tone is sent to the subscriber at 1604. If the selected channel type is valid, a determination is then made as to whether the signaling type is valid at 1612. Signal type refers to the necessary signaling to access the media linked to that channel. If the signaling type is not valid, a reorder tone is sent to the subscriber at 1604. If the signaling type is valid, a determination is then made as to whether the channel is to be used in satellite communications at 1614. If the channel is not to be used in satellite communications, then the signal type is saved at 1616 and an acknowledgment tone is sent to the subscriber at 1618. If the channel is to be used in satellite communications, then a determination is made as to whether the channel type is appropriate for satellite communications at 1620. If the channel type is not appropriate for satellite communications, then a reorder tone is sent to the subscriber at 1622. If the channel type is appropriate for satellite communications, the channel type is saved at 1624, the signaling type is saved at 1628, and an acknowledgment tone is sent to the subscriber at 1630.

Figure 17:
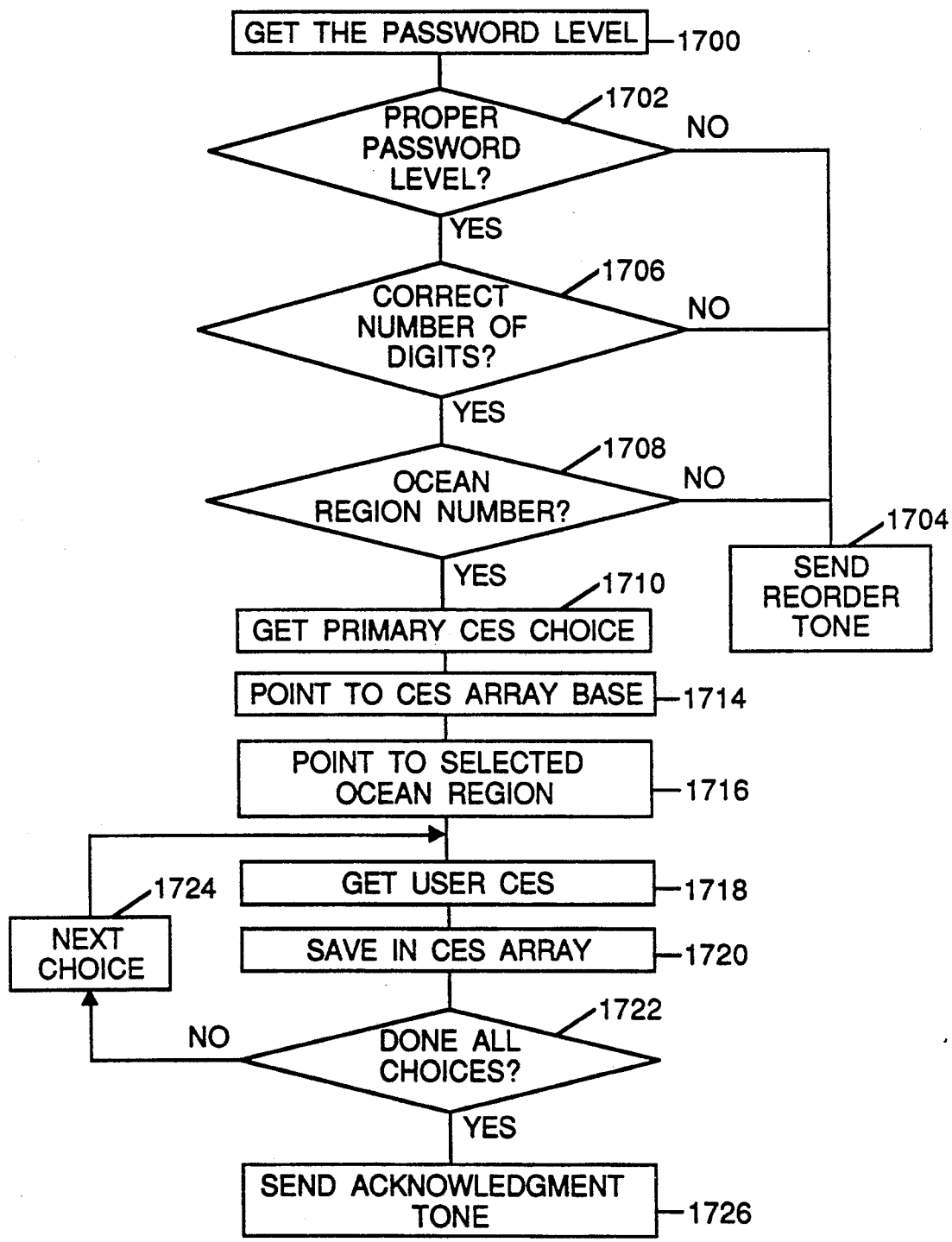
FIG. 17 is a flow chart detailing the setting of the default coast earth stations.

FIG. 17 shows the steps in the task of setting the default coastal earth stations such that changes to the tariff table may be entered. Upon obtaining the password at 1700, it is determined at 1702 whether the password is proper according to the steps of FIG. 10. If the password is not proper, a reorder tone is sent to the subscriber at 1704. If the password is proper, a determination is then made as to whether the correct number of digits has been entered at 1706. If the correct number of digits has not been entered at 1706, a reorder tone is sent to the subscriber at 1704. If the correct number of digits has been entered at 1706, a determination is then made as to whether the ocean region number is valid at 1708. If the ocean region number is not valid, then a reorder tone is sent to the subscriber at 1704. If the ocean region number is valid, then the primary CES choice is obtained at 1710. The CES array base is then pointed to at 1714 and the selected ocean region is pointed to at 1716. The user CES is then obtained at 1718 and the user CES is then saved in a CES array at 1720. A determination is then made as to whether all choices have been made at 1722. If not all choices have been completed, then the next choice is incremented at 1724 and the user CES is then obtained again at 1718. If all choices have been completed at 1722, then an acknowledgment tone is sent to the subscriber at 1726.

Figure 18:
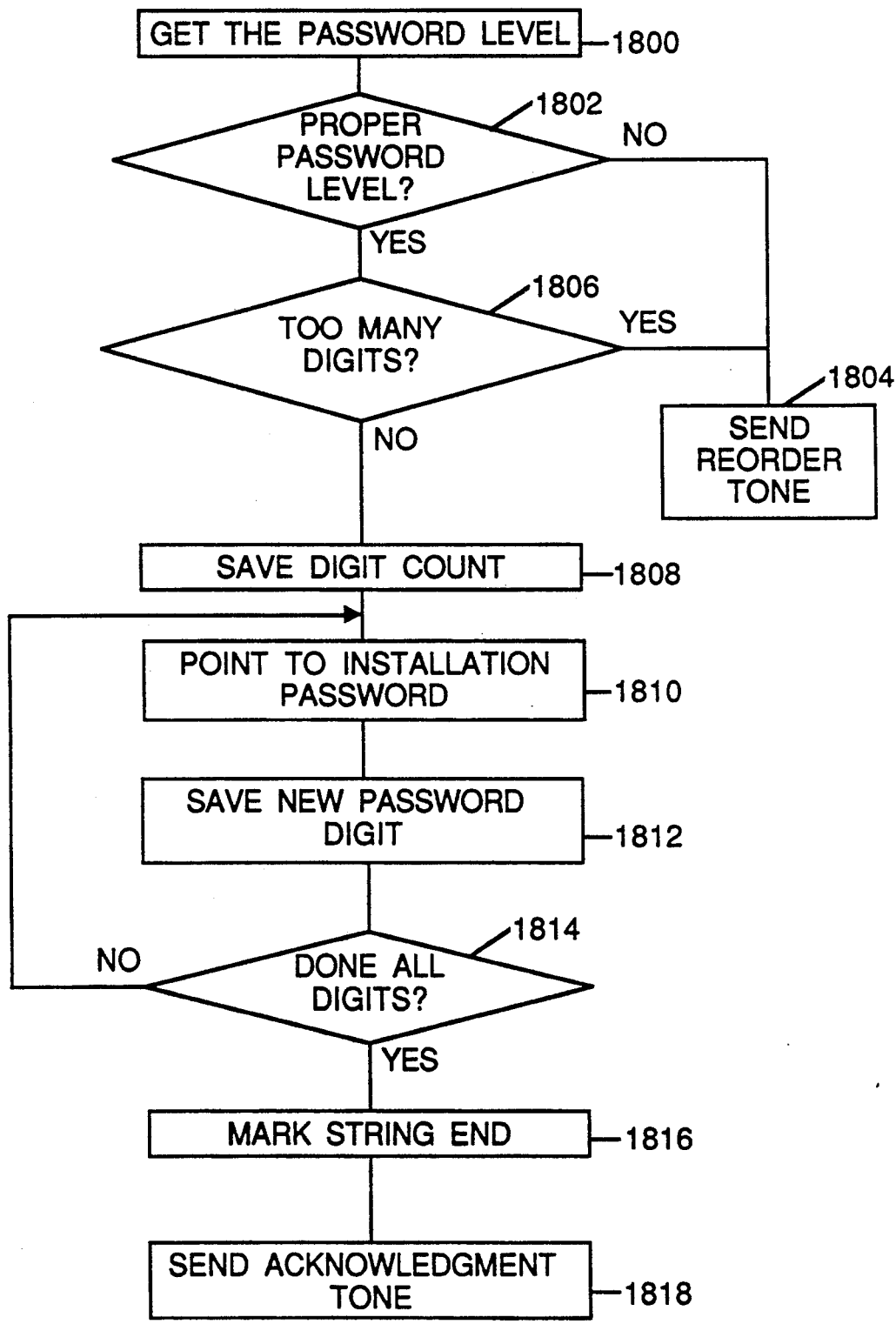
FIG. 18 is a flow chart detailing the setting of the configuration password.
Figure 19:
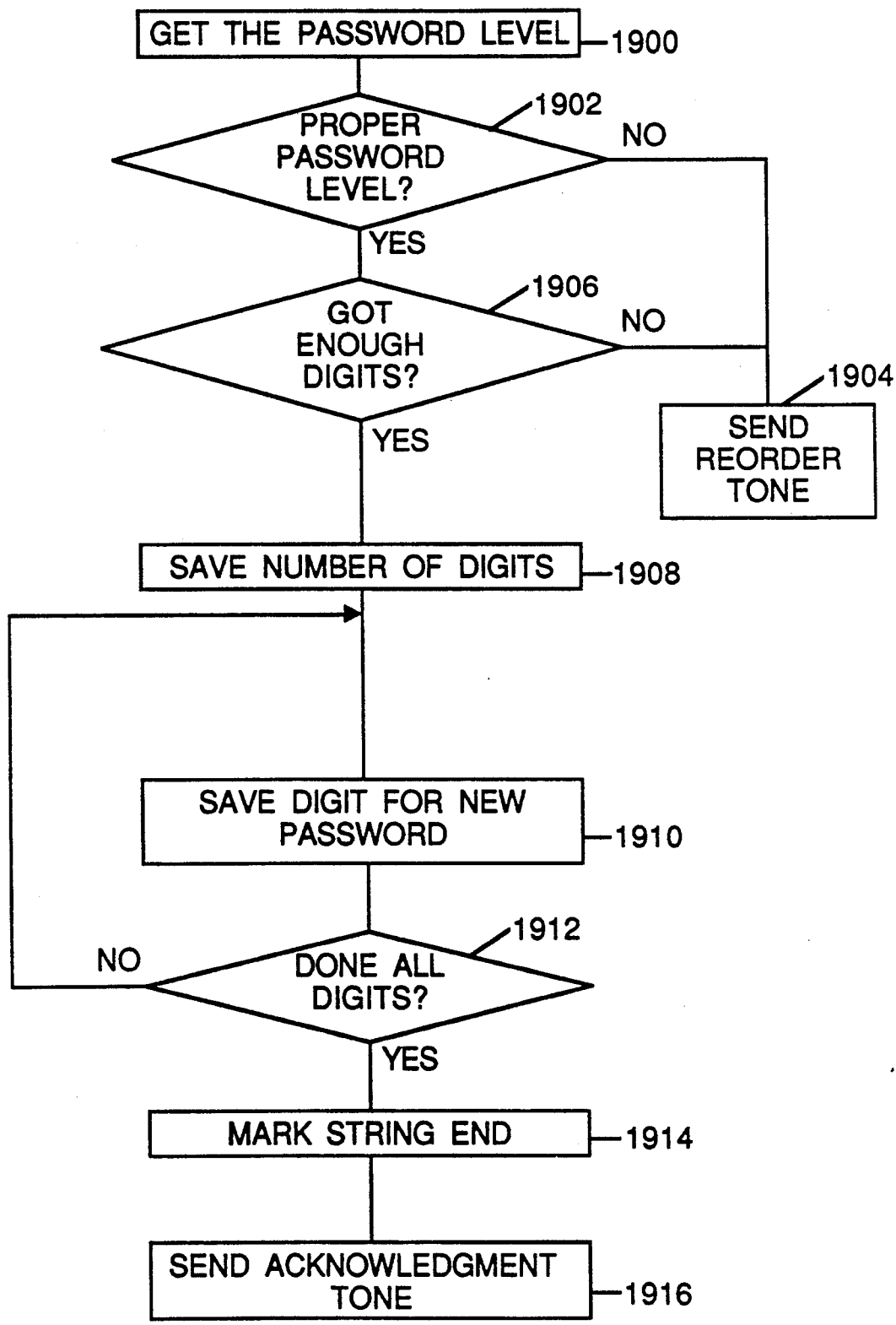
FIG. 19 is a flow chart detailing the setting of the dial access password.

FIG. 18 shows the steps in the task of setting the configuration password, that is the password necessary to make the configurations or settings in association with the interface of the present invention. Upon obtaining the password at 1800, it is determined at 1802 whether the password is proper according to the steps of FIG. 10. If the password is not proper, a reorder tone is sent to the subscriber at 1804. If the password is proper, a determination is then made as to whether too many digits have been entered at 1806. If too many digits have been entered at 1806, then a reorder tone is sent to the subscriber at 1804. If there are not too many digits at 1806, then the digit count is saved at 1808, the installation password is pointed to at 1810, and the new password digit is saved at 1812. A determination is then made as to whether all the digits have been saved at 1814. If not all digits have been saved, then the installation password is again pointed to at 1810. If all the digits have been saved at 1814, the string end is marked at 1816, and an acknowledgment tone is sent to the subscriber at 1818.

FIG. 19 shows the steps in the task of setting the dial access password, that is the password necessary to enable an outgoing call through the interface (FIG. 12) or to set the least cost routing on/off (FIG. 14). Upon obtaining the password at 1900, it is determined at 1902 whether the password is proper according to the steps of FIG. 10. If the password is not proper, a reorder tone is sent to the subscriber at 1904. If the password is proper, a determination is then made as to whether there are enough digits that have been entered at 1906. If not enough digits have been entered at 1906, then a reorder tone is sent to the subscriber at 1904. If enough digits have been entered at 1906, the digit count is saved at 1908, the installation password is pointed to at 1909, and the new password digit is saved at 1910. A determination is then made as to whether all the digits have been saved at 1912. If not all digits have been saved, then the configuration password is again pointed to at 1909. If all the digits have been saved at 1912, the string end is marked at 1914, and a acknowledgment tone is sent to the subscriber at 1916.

Figure 20:
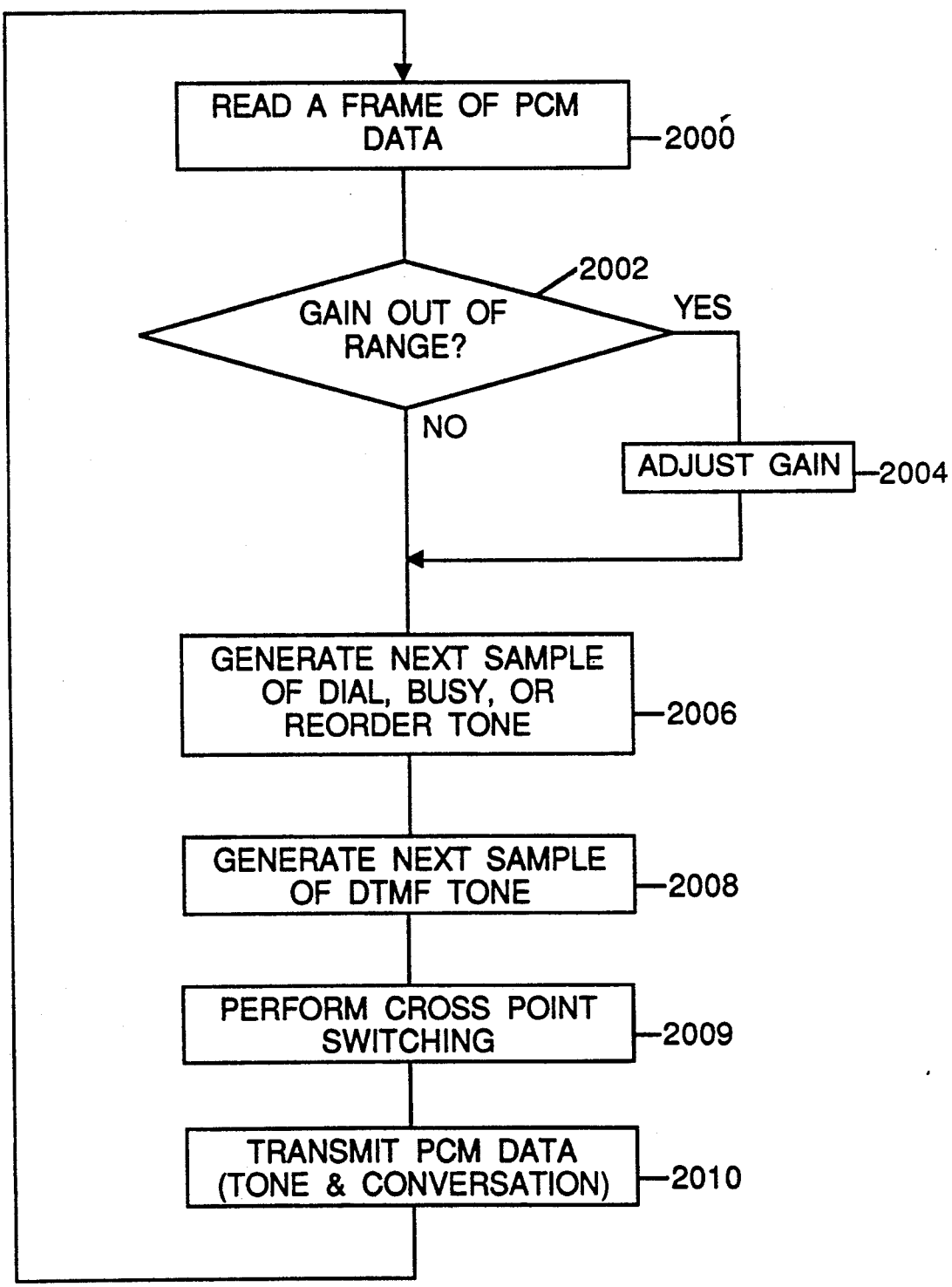
FIG. 20 is a flow chart detailing the steps executed by the first digital signal processor.

FIG. 20 shows the steps executed by the first digital signal processor 24. The first digital signal processor 24 performs tone generation for all of the satellite communications and telephony single and dual tones, cross point switching between the trunk channels 1, 2, 3, and 4 and the station channels 11, 12, 13, and 14, and the transmission leveling function. A frame of PCM data is read at 2000. A determination by the digital signal processor 24 is then made to determine whether the gain is out of a preselected permissible range at 2002. If the gain is out of range, the digital signal processor 24 adjusts the gain at 2004. Subsequent to the gain adjustment at 2004, or if the gain is in range at 2002, the next sample of dial, busy, or reorder tone is generated at 2006. The next sample of DTMF tones is then generated at 2008. Then, cross point switching between station and trunk channels is done at 2009. Transmission of PCM data, both tone and conversation, is accomplished at 2010. The digital signal processor then loops back to 2000 to read a frame of PCM data. The steps of the first digital signal processor 24 are thus performed continually.

Figure 21:
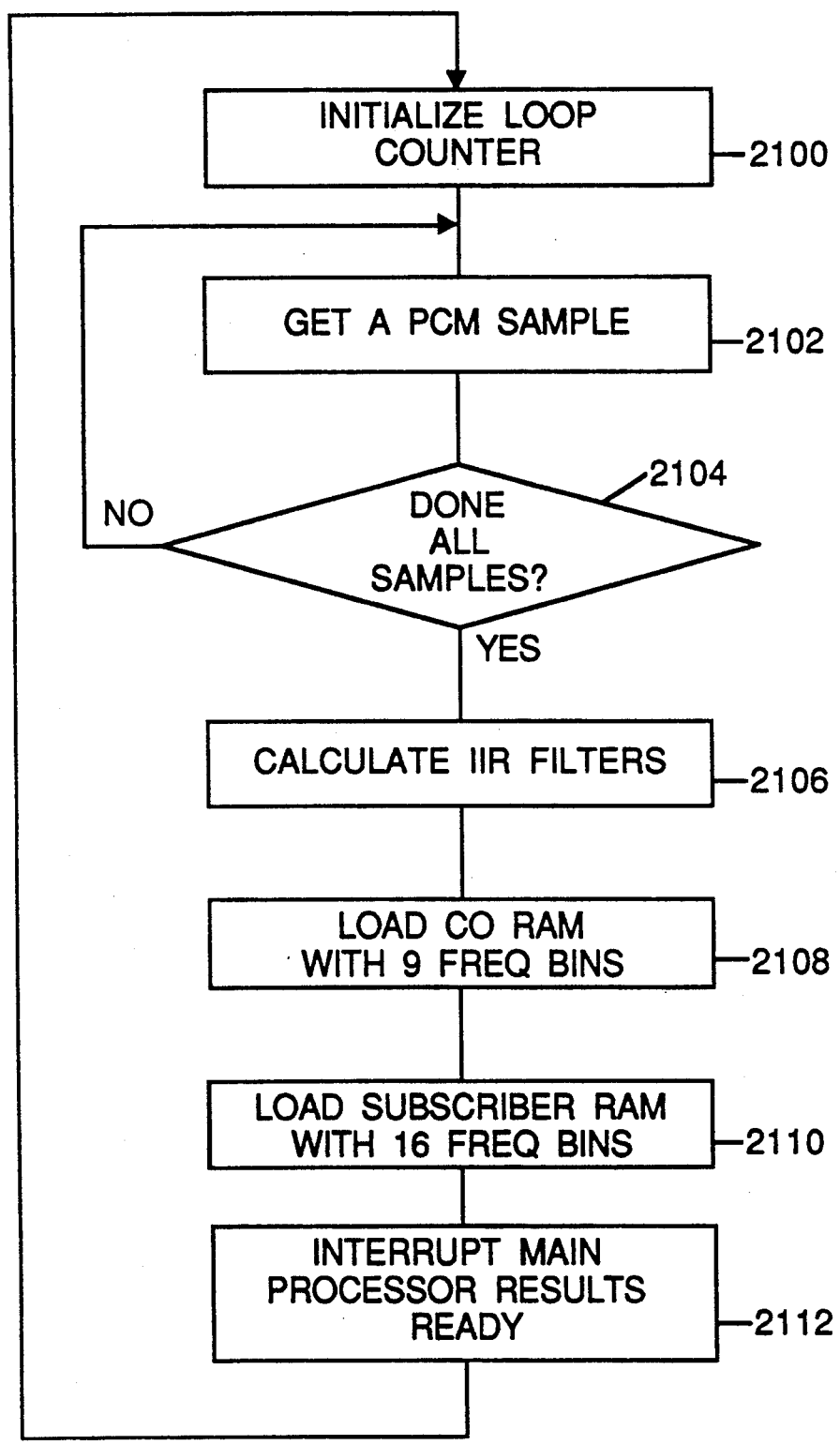
FIG. 21 is a flow chart detailing the steps executed by the second digital signal processor.

FIG. 21 shows the steps executed by the second digital signal processor 26. The second digital processor 26 performs all of the tone decoding of all the satellite communication tones and telephony single and dual tones. The loop counter is initialized at 2100. A PCM sample is obtained at 2102 and a determination is then made as to whether all samples have been done at 2104. If not all samples have been done, then the second digital signal processor 26 returns to get a sample again at 2102. If all samples have been done at 2104, then frequency filters of FIG. 7B are calculated at 2106, the C RAM is loaded with nine frequency bins at 2108, the subscriber RAM is loaded with sixteen frequency bins at 2110, and the CPU 22 is interrupted at 2112 to inform of the results. The CO and subscriber rams are collectively represented as the boot and data static RAM 66 and the static RAM 68. The digital signal processor 26 then loops back to 2100 to initialize the loop counter. The steps of the second digital signal processor 26 are thus performed continually.

The operation of the interface between mobile telecommunication systems and trunks that link to communication carriers is as follows. The current ocean region is selected (see FIG. 11), the outgoing trunk channels are enabled (see FIG. 12), the PABX SMDR interface is enabled, if applicable (see FIG. 13), the least cost routing is enabled (see FIG. 14), the channel routing sequence is set (see FIGS. 15A and 15B), and the trunk channel parameters are set (see FIGS. 16A and 16B) in advance of use by a subscriber. When a subscriber then takes a telecommunication device off hook at any of the station channels, a dial tone is sent to that station channel and the subscriber dials the telephone number of the outgoing telephone call using the North American dialing plan (see generally FIGS. 6A and 6B). The interface captures the sequence of the dialing digits and routes the call according to a hierarchy of media (see generally FIG. 6C). If the call is routed to satellite, the interface examines the country code selected by the subscriber in the dialing sequence and selects the least cost coast earth station from a lookup table, basing such a selection on the ocean region that was programmed into the interface in advance of the call, the destination of the call, and other considerations (see FIG. 6C at 667). The interface then redials the telephone number by the adding or stripping of digits so that the call may be understood by the selected carrier (FIG. 6D at 674). For a call completed via satellite communications, the interface sends a string of electronic signals appropriate to access a satellite to make the connection (FIG. 6D at 672). The gain is adjusted by the interface to compensate for differences in audio level from the different media (FIG. 20 at 2004).

Call progress through the interface is supervised to insure the presence of voice or data activity such that a call is terminated after a period of ring no answer, busy, dead air, etc. (FIG. 6D at 675). Such indicia of call progress are identified by passing the audio pass band through an array of filters (see generally FIG. 7B). The interface further adjusts the level of transmission for data transactions relative to transmission of voice (FIG. 7B at 738). The interface also provides an echo suppressor (114) for telephone calls via satellite to remove echo signals from signal reflections. The interface of the present invention provides for an accurate call record of all calls originating from the ship for billing purposes (FIG. 6C at 682).

It is to be understood that each of the different trunks may be dedicated to different media, or there may be some duplication such that the same media may be represented in more than one trunk. Discussion of the invention to this point has presumed that a given medium is represented by a single network. It is to be understood that where a medium has multiple networks, it is possible to have a hierarchy of networks rather than just of media, and this is to be considered within the scope of the present invention. Thus, duplications of media between different trunks may also be a duplication of networks, but not necessarily so.

It is to be understood that this invention is not limited to a specific number of station channels and trunk channels. Further, though the discussion has related the interface of the present invention to the specific environment of an oceangoing vessel, it should be apparent that the invention may be equally adaptable for use in other mobile environments such as rail or in the air, and it is to be further understood that the invention is not limited to use on ocean going vessels.

It is to be understood that the invention is not confined to the particular construction and arrangement of parts herein illustrated and described, but embraces such modified forms thereof as come within the scope of the following claims.

What is claimed is:

1. An interface between a plurality of mobile telecommunication stations and a plurality of trunks that link to communication carriers of various media, the interface comprising:
   (a) station channels that connect to the telecommunication stations;
   (b) trunk channels that connect to the trunks that link to the communication carriers of various media;
   (c) means for interrogating the trunk channels for availability upon the initiation of an outgoing telephone call originating from one of the telecommunication stations;
   (d) means for determining the communication medium of least cost according to a preselected hierarchy of the media of communication;
   (e) means for routing the telephone call from one of the station channels to the available trunk channel linked to the communication carrier having the medium of least cost; and
   (f) means for adjusting the audio level to compensate for differences between the communication media.

2. An interface between a plurality of mobile telecommunication stations and a plurality of trunks that link to communication carriers of various media, the interface comprising:
   (a) station channels that connect to the telecommunication stations;
   (b) trunk channels that connect to the trunks that link to the communication carries of various media;
   (c) means for interrogating the trunk channels for availability upon the initiation of an outgoing telephone call originating from one of the telecommunication stations;
   (d) means for determining the communication medium of least cost according to a preselected hierarchy of the media of communication;
   (e) means for routing the telephone call from one of the station channels to the available trunk channel linked to the communication carrier having the medium of least cost; and
   (f) means for filtering the audio pass band of the telephone call through a plurality of frequency filters of different frequency ranges to identify indicia of all progress, wherein the means for filtering includes a filter that determines when data activity is present such that the audio level is compensated for transmission of such data relative to transmission of voice.

3. An interface between a plurality of mobile telecommunication stations and a plurality of trunks that link to communication carriers of various media, the interface comprising:
   (a) station channels that connect to the telecommunication stations;
   (b) trunk channels that connect to the trunks that link to the communication carries of various media, wherein one of the trunk channels is adapted to be connected to a trunk that is applied to a communication medium capable of linking to a plurality of carriers of the same medium;
   (c) means for interrogating the trunk channels for availability upon the initiation of an outgoing telephone call originating from one of the telecommunication stations;
   (d) means for determining the communication medium of least cost according to a preselected hierarchy of the media of communication;
   (e) means for routing the telephone call from one of the station channels to the available trunk channel linked to the communication carrier having the medium of least cost;
   (f) a memory that contains a lookup table of tariff information that relates to the different carriers of the communication medium capable of linking to the plurality of carriers of the same medium;
   (g) means for selecting the communication carrier of least cost upon routing the telephone call to the trunk channel that is adapted to be connected to the trunk that is applied to the communication medium capable of linking to the plurality of carriers of the same medium; and
   (h) means for adjusting the audio level to compensate for differences between the communication media.

4. An interface between a plurality of mobile telecommunication stations and a plurality of trunks that link to communication carriers of various media, the interface comprising:
   (a) station channels that connect to the telecommunication stations;
   (b) trunk channels that connect to the trunks that link to the communication carriers of various media, wherein one of the trunk channels is adapted to be connected to a trunk that is applied to a communication medium capable of linking to a plurality of carriers of the same medium;

(c) means for interrogating the trunk channels for availability upon the initiation of an outgoing telephone call originating from one of the telecommunication stations;

(d) means for determining the communication medium of least cost according to a preselected hierarchy of the media of communication;

(e) means for routing the telephone call from one of the station channels to the available trunk channel linked to the communication carrier having the medium of least cost;

(f) a memory that contains a lookup table of tariff information that relates to the different carriers of the communication medium capable of linking to the plurality of carriers of the same medium;

(g) means for selecting the communication carrier of least cost upon routing the telephone call to the trunk channel that is adapted to be connected to the trunk that is applied to the communication medium capable of linking to the plurality of carriers of the same medium; and (h) means for filtering the audio pass band of the telephone call through a plurality of frequency filters of different frequency ranges to identify indicia of call progress, wherein the means for filtering includes a filter that determines when data activity is present such that the audio level is compensated for transmission of such data relative to transmission of voice.

5. An interface between a plurality of mobile telecommunication stations and a plurality of trunks that link to communication carriers of various networks, the interface comprising:

(a) station channels that connect to the telecommunication stations;

(b) trunk channels that connect to the trunks that link to the communication carriers of various networks;

(c) means for interrogating the trunk channels for availability upon the initiation of an outgoing telephone call originating from one of the telecommunication stations;

(d) means for determining the communication network of least cost according to a preselected hierarchy of the networks of communication;

(e) means for routing the telephone call from one of the station channels to the available trunk channel linked to the communication carrier having the network of least cost; and (f) means for adjusting the audio level to compensate for differences between the communication networks.

6. An interface between a plurality of mobile telecommunication stations and a plurality of trunks that link to communication carriers of various networks, the interface comprising:

(a) station channels that connect to the telecommunication stations;

(b) trunk channels that connect to the trunks that link to the communication carriers of various networks;

(c) means for interrogating the trunk channels for availability upon the initiation of an outgoing telephone call originating from one of the telecommunication stations;

(d) means for determining the communication network of least cost according to a preselected hierarchy of the networks of communication;

(e) means for routing the telephone call from one of the station channels to the available trunk channel linked to the communication carrier having the network of least cost; and (f) means for filtering the audio pass band of the telephone call through a plurality of frequency filters of different frequency ranges to identify indicia of call progress, wherein the means for filtering includes a filter that determines when data activity is present such that the audio level is compensated for transmission of such data relative to transmission of voice.

7. An interface between a plurality of mobile telecommunication stations and a plurality of trunks that link to communication carriers of various networks, the interface comprising:

(a) station channels that connect to the telecommunication stations;

(b) trunk channels that connect to the trunks that link to the communication carriers of various networks, wherein one of the trunk channels is adapted to be connected to a trunk that is applied to a communication network capable of linking to a plurality of carriers of the same network;

(c) means for interrogating the trunk channels for availability upon the initiation of an outgoing telephone call originating from one of the telecommunication stations;

(d) means for determining the communication network of least cost according to a preselected hierarchy of the networks of communication;

(e) means for routing the telephone call from one of the station channels to the available trunk channel linked to the communication carrier having the network of least cost;

(f) a memory that contains a lookup table of tariff information that relates to the different carriers of the communication network capable of linking to the plurality of carriers of the same network;

(g) means for selecting the communication carrier of least cost upon routing the telephone call to the trunk channel that is adapted to be connected to the trunk that is applied to the communication network capable of linking to the plurality of carriers of the same network; and (h) means for adjusting the audio level to compensate for differences between the communication networks.

8. An interface between a plurality of mobile, telecommunication stations and a plurality of trunks that link to communication carriers of various networks, the interface comprising:

(a) station channels that connect to the telecommunication stations;

(b) trunk channels that connect to the trunks that link to the communication carriers of various networks, wherein one of the trunk channels is adapted to be connected to a trunk that is applied to a communication network capable of linking to a plurality of carriers of the same network;

(c) means for interrogating the trunk channels for availability upon the initiation of an outgoing telephone call originating form one of the telecommunication stations;

(d) means for determining the communication network of least cost according to a preselected hierarchy of the networks of communication;
(e) means for routing the telephone call from one of the station channels to the available trunk channel linked to the communication carrier having the network of least cost;
(f) a memory that contains a lookup table of tariff information that relates to the different carriers of the communication network capable of linking to the plurality of carriers of the same network;
(g) means for selecting the communication carrier of least cost upon routing the telephone call to the trunk channel that is adapted to be connected to the trunk that is applied to the communication network capable of linking to the plurality of carriers of the same network; and
(h) means for filtering the audio pass band of the telephone call through a plurality of frequency filters of different frequency ranges to identify indicia of call process, wherein the means for filtering includes a filter that determines when data activity is present such that the audio level is compensated for transmission of such data relative to transmission of voice.

9. An interface between a plurality of mobile telecommunication stations and a plurality of mobile telecommunication stations and a plurality of trunks that link to communication carriers, the interface comprising:
(a) station channels that connect to the telecommunication stations;
(b) trunk channels that connect to the trunks that link to the communication carriers;
(c) means for interrogating the different terminal channels for availability upon the initiation of an outgoing telephone call originating from one of the telecommunication stations;
(d) means for routing the telephone call from one of the station channels to an available trunk channel; and
(e) means for filtering the audio pass band of the telephone call through a plurality of frequency filters of different frequency ranges to identify indicia of call progress, wherein the means for filtering includes a filter that determines when data activity is present such that the audio level is compensated for transmission of such data relative to transmission of voice.

10. A method of interfacing between a plurality of mobile telecommunication stations and a plurality of trunks that link to communication carriers of various media upon the initiation of an outgoing telephone call originating from one of the telecommunication stations, the method comprising the steps of:
(a) interrogating the different trunks for availability;
(b) determining the communication medium of least cost according to a preselected hierarchy of the media of communication;
(c) routing the telephone call form one of the telecommunication stations to the available trunk linked to the communication carrier having the medium of least cost; and
(d) adjusting the audio level to compensate for differences between the communication media.

11. A method of interfacing between a plurality of mobile telecommunication stations and a plurality of trunks that link to communication carriers of various media upon the initiation of an outgoing telephone call originating from one of the telecommunication stations, the method comprising the steps of:
(a) interrogating the different trunks for availability;
(b) determining the communication medium of least cost according to a preselected hierarchy of the media of communication;
(c) routing the telephone call from one of the telecommunication stations to the available trunk linked to the communication carrier having the medium of least cost; and
(d) filtering the audio pass band of the telephone call through a plurality of frequency filters of different frequency ranges to identify indicia of call progress, wherein the step of filtering includes determining when data activity is present such that the audio level is compensated for transmission of such data relative to transmission of voice.

12. A method of interfacing between a plurality of mobile telecommunication stations and a plurality of trunks that link to communication carriers of various networks upon the initiation of an outgoing telephone call originating from one of the telecommunication stations, the method comprising the steps of:
(a) interrogating the different trunks for availability;
(b) determining the communication network of least cost according to a preselected hierarchy of the networks of communication;
(c) routing the telephone call from one of the telecommunication stations to the available trunk linked to the communication carrier having the network of least cost; and
(d) adjusting the audio level to compensate for differences between the communication media.

13. A method of interfacing between a plurality of mobile telecommunication stations and a plurality of trunks that link to communication carriers of various networks upon the initiation of an outgoing telephone call originating from one of the telecommunication stations, the method comprising the steps of:
(a) interrogating the different trunks for availability;
(b) determining the communication network of least cost according to a preselected hierarchy of the networks of communication;
(c) routing the telephone call from one of the telecommunication stations to the available trunk linked to the communication carrier having the network of least cost; and
(d) filtering the audio pass band of the telephone call through a plurality of frequency filters of different frequency ranges to identify indicia of call progress, wherein the step of filtering includes determining when data activity is present such that the audio level is compensated for transmission of such data relative to transmission of voice.

14. An active mobile interface capable of connecting between a plurality of telecommunication stations and a plurality of trunks that link to communication carriers of various media, wherein the interface, the telecommunication stations, and the trunk being situated upon a mobile environment, wherein a medium is any of various transmission means to accomplish a connection of an outgoing telephone call between a calling party at the telecommunication station and a called party at a remote location and a communication carrier is the specific agent through which the connection is made, the interface comprising:

(a) station channels that connect to the telecommunication stations;

(b) trunk channels that connect to the trunks that link to the communication carriers of various media, wherein one of the trunk channels is adapted to be connected to a trunk that is applied to a communication medium capable of linking to a plurality of carriers of the same medium;

(c) means for interrogating the trunk channels for availability upon the initiation of the outgoing telephone call originating from one of the telecommunication stations, the availability of a particular trunk channel being variably dependent upon location of the mobile environment and the medium to which the trunk channel is connected;

(d) means for determining the communication medium of least cost according to a preselected hierarchy of the media of communication;

(e) means for routing the telephone call from one of the station channels to the available trunk channel linked to the communication carrier having the medium of least cost;

(f) a memory that contains a lookup table of tariff information that relates to the different carriers of the communication medium capable of linking to the plurality of carriers of the same medium, wherein the lookup table contains rates of the different carriers as affected by the geographic region of the telecommunication stations and the destination of the telephone call; and (g) means for selecting the communication carrier of least cost upon routing the telephone call to the trunk channel that is adapted to be connected to the trunk that is applied to the communication medium capable of linking to the plurality of carriers of the same medium.

15. The interface of claim 14 wherein each of the media are represented by a network of the respective medium.

16. The interface of claim 14 wherein the communication medium capable of linking to a plurality of carriers is via satellite communications and the carriers are different coast earth stations.

17. The interface of claim 16 further comprising means for producing a preselected string of electronic signals appropriate to access a satellite to effect the satellite communications.

18. The interface of claim 16 further comprising an echo suppressor to remove echo signals from signal reflections associated with the satellite communications.

19. The interface of claim 14 wherein the memory is contained within a cartridge that is independent of the rest of the interface such that the cartridge may be plugged into and out of the interface in order that the cartridge may be substituted for upgrade purposes.

20. The interface of claim 19 wherein the means for interrogating, the means for determining, the means for routing, and the means for selecting are executable by software code that is contained within the cartridge for downloading into the interface.

21. The interface of claim 14 further comprising means for overriding the means for routing such that a subscriber may select the desired carrier.

22. The interface of claim 14 further comprising:

(a) means for capturing the telephone number dialed to make the outgoing call originating from one of the telecommunication stations; and (b) means for redialing the telephone number by the adding or stripping of necessary digits so that the redialed telephone number is understood by the carrier to which the telephone call is routed.

23. The interface of claim 14 further comprising means for filtering the audio pass band of the telephone call through a plurality of frequency filters of different frequency ranges to identify indicia of call progress.

24. The interface of claim 23 wherein the means for filtering includes a filter that determines when voice or data activity is absent such that the telephone call is terminated after a preselected period of time in which voice or data activity is absent.

25. The interface of claim 14 further including means for recording of preselected call information for billing purposes.

26. The interface of claim 25 wherein the preselected call information includes date and time of the telephone call, communication medium, dialed number, and duration of the telephone call.

27. An active mobile interface capable of connecting between a plurality of telecommunication stations and a plurality of trunks that link to communication carriers of various media, wherein the interface, the telecommunication stations, and the trunk being situated upon a mobile environment, wherein a medium is any of various transmission means to accomplish a connection of an outgoing telephone call between a calling party at the telecommunication station and a called party at a remote location and a communication carrier is the specific agent through which the connection is made, the interface comprising:

(a) station channels that connect to the telecommunication stations;

(b) trunk channels that connect to the trunks that link to the communication carries of various media, wherein one of the trunk channels is adapted to be connected to a trunk that is applied to a communication medium capable of linking to a plurality of carriers of the same medium;

(c) means for interrogating the trunk channels for availability upon the initiation of the outgoing telephone call originating from one of the telecommunication stations, the availability of a particular trunk channel being variably dependent upon location of the mobile environment and the medium to which the trunk channel is connected;

(d) means for determining the communication medium of least cost according to a preselected hierarchy of the media of communication;

(e) means for routing the telephone call from one of the station channels to the available trunk channel linked to the communication carrier having the medium of least cost;

(f) a memory that contains a lookup table of tariff information that relates to the different carriers of the communication medium capable of linking to the plurality of carriers of the same medium, wherein the lookup table contains rates of the different carriers as affected by the geographic region of the telecommunication stations and the destination of the telephone call;

(g) means for inputting and storing information on the geographic region in which the telecommunication stations are situated; and (h) means for selecting the communication carrier of least cost upon routing the telephone call to the trunk channel that is adapted to be connected to the trunk that is applied to the communication medium capable of linking to the plurality of carriers of the same medium, the selecting by the means for selecting being accomplished by relating information in the lookup table and the information stored on the geographic region in which the telecommunication stations are situated.

28. The interface of claim 27 wherein each of the media are represented by a network of the respective medium.

29. The interface of claim 27 wherein the communication medium capable of linking to a plurality of carriers is via satellite communications and the carriers are different coast earth stations.

30. The interface of claim 29 further comprising means for producing a preselected string of electronic signals appropriate to access a satellite to effect the satellite communications.

31. The interface of claim 29 further comprising an echo suppressor to remove echo signals from signal reflections associated with the satellite communications.

32. The interface of claim 27 wherein the memory is contained within a cartridge that is independent of the rest of the interface such that the cartridge may be plugged into and out of the interface in order that the cartridge may be substituted for upgrade purposes.

33. The interface of claim 32 wherein the means for interrogating, the means for determining, the means for routing, and the means for selecting are executable by software code that is contained within the cartridge for downloading into the interface.

34. The interface of claim 27 further comprising means for overriding the means for routing such that a subscriber may select the desired carrier.

35. The interface of claim 27 further comprising:
(a) means for capturing the telephone number dialed to make the outgoing call originating from one of the telecommunication stations; and
(b) means for redialing the telephone number by the adding or stripping of necessary digits so that the redialed telephone number is understood by the carrier to which the telephone call is routed.

36. The interface of claim 27 further comprising means for filtering the audio pass band of the telephone call through a plurality of frequency filters of different frequency ranges to identify indicia of call progress.

37. The interface of claim 36 wherein the means for filtering includes a filter that determines when voice or data activity is absent such that the telephone call is terminated after a preselected period of time in which voice or data activity is absent.

38. The interface of claim 27 further including means for recording of preselected call information for billing purposes.

39. The interface of claim 38 wherein the preselected call information includes date and time of the telephone call, communication medium, dialed number, and duration of the telephone call.

40. An active mobile interface capable of connecting between a plurality of telecommunication stations and a plurality of trunks that link to communication carriers of various networks, wherein the interface, the telecommunication stations, and the trunk being situated upon a mobile environment, wherein a network is a collection of carriers of the same medium that share access to that medium and a communication carrier is the specific agent through which the connection is made, the interface comprising:

(a) station channels that connect to the telecommunication stations;
(b) trunk channels that connect to the trunks that link to the communication carriers of various networks, wherein one of the trunk channels is adapted to be connected to a trunk that is applied to a communication network capable of linking to a plurality of carriers of the same network;
(c) means for interrogating the trunk channels for availability upon the initiation of an outgoing telephone call originating from one of the telecommunication stations, the availability of a particular trunk channel being variably dependent upon location of the mobile environment and the network to which the trunk channel is connected;
(d) means for determining the communication network of least cost according to a preselected hierarchy of the networks of communication;
(e) means for routing the telephone call from one of the station channels to the available trunk channel linked to the communication carrier having the network of least cost;
(f) a memory that contains a lookup table of tariff information that relates to the different carriers of the communication network capable of linking to the plurality of carriers of the same network, wherein the lookup table contains rates of the different carriers as affected by the geographic region of the telecommunication stations and the destination of the telephone call; and
(g) means for selecting the communication carrier of least cost upon routing the telephone call to the trunk channel that is adapted to be connected to the trunk that is applied to the communication network capable of linking to the plurality of carriers of the same network.

41. The interface of claim 40 wherein the communication network capable of linking to a plurality of carriers is via satellite communications and the carriers are different coast earth stations.

42. The interface of claim 41 further comprising means for producing a preselected string of electronic signals appropriate to access a satellite to effect the satellite communications.

43. The interface of claim 41 further comprising an echo suppressor to remove echo signals form signal reflections associated with the satellite communications.

44. The interface of claim 40 wherein the memory is contained within a cartridge that is independent of the rest of the interface such that the cartridge may be plugged into and out of the interface in order that the cartridge may be substituted for upgrade purposes.

45. The interface of claim 44 wherein the means for interrogating, the means for determining, the means for routing, and the means for selecting are executable by software code that is contained within the cartridge for downloading into the interface.

46. The interface of claim 40 further comprising means for overriding the means for routing such that a subscriber may select the desired carrier.

47. The interface of claim 40 further comprising:
(a) means for capturing the telephone number dialed to make the outgoing call originating from one of the telecommunication stations; and
(b) means for redialing the telephone number by the adding or stripping of necessary digits so that the redialed telephone number is understood by the carrier to which the telephone call is routed.

48. The interface of claim 40 further comprising means for filtering the audio pass band of the telephone call through a plurality of frequency filters of different frequency ranges to identify indicia of call progress.

49. The interface of claim 48 wherein the means for filtering includes a filter that determines when voice or data activity is absent such that the telephone call is terminated after a preselected period of time in which voice or data activity is absent.

50. The interface of claim 40 further including means for recording of preselected call information for billing purposes.

51. The interface of claim 50 wherein the preselected call information includes date and time of the telephone call, communication network, dialed number, and duration of the telephone call.

52. An active mobile interface capable of connecting between a plurality of telecommunication stations and a plurality of trunks that link to communication carriers of various networks, wherein the interface, the telecommunication stations, and the trunk being situated upon a mobile environment, wherein a network is a collection of carriers of the same medium that share access to that medium and a communication carrier is the specific agent through which the connection is made, the interface comprising:
 (a) station channels that connect to the telecommunication stations;
 (b) trunk channels that connect to the trunks that link to the communication carries of various networks, wherein one of the trunk channels is adapted to be connected to a trunk that is applied to a communication network capable of linking to a plurality of carriers of the same network;
 (c) means for interrogating the trunk channels for availability upon the initiation of an outgoing telephone call originating from one of the telecommunication stations, the availability of a particular trunk channel being variably dependent upon location of the mobile environment and the network to which the trunk channel is connected;
 (d) means for determining the communication network of least cost according to a preselected hierarchy of the networks of communication;
 (e) means for routing the telephone call from one of the station channels to the available trunk channel linked to the communication carrier having the network of least cost;
 (f) a memory that contains a lookup table of tariff information that relates to the different carriers of the communication network capable of linking to the plurality of carries of the same network, wherein the lookup table contains rates of the different carriers as affected by the geographic region of the telecommunication stations and the destination of the telephone call;
 (g) means for inputting and storing information on the geographic region of the telecommunication in which the telecommunication stations are situated; and
 (h) means for selecting the communication carrier of least cost upon routing the telephone call to the trunk channel that is adapted to be connected to the trunk that is applied to the communication network capable of linking to the plurality of carriers of the same network, the selecting by the means for selecting being accomplished by relating information in the lookup table and the information stored on the geographic region in which the telecommunication stations are situated.

53. The interface of claim 52 wherein the communication network capable of linking to a plurality of carriers is via satellite communications and the carriers are different coast earth stations.

54. The interface of claim 53 further comprising means for producing a preselected string of electronic signals appropriate to access a satellite to effect the satellite communications.

55. The interface of claim 53 further comprising an echo suppressor to remove echo signals from signal reflections associated with the satellite communications.

56. The interface of claim 52 wherein the memory is contained within a cartridge that is independent of the rest of the interface such that the cartridge may be plugged into and out of the interface in order that the cartridge may be substituted for upgrade purposes.

57. The interface of claim 56 wherein the means for interrogating, the means for determining, the means for routing, and the means for selecting are executable by software code that is contained within the cartridge for downloading into the interface.

58. The interface of claim 52 further comprising means for overriding the means for routing such that a subscriber may select the desired carrier.

59. The interface of claim 52 further comprising:
 (a) means for capturing the telephone number dialed to make the outgoing call originating from one of the telecommunication stations; and
 (b) means for redialing the telephone number by the adding or stripping of necessary digits so that the redialed telephone number is understood by the carrier to which the telephone call is routed.

60. The interface of claim 52 further comprising means for filtering the audio pass band of the telephone call through a plurality of frequency filters of different frequency ranges to identify indicia of call progress.

61. The interface of claim 60 wherein the means for filtering includes a filter that determines when voice or data activity is absent such that the telephone call is terminated after a preselected period of time in which voice or data activity is absent.

62. The interface of claim 52 further including means for recording of preselected call information for billing purposes.

63. The interface of claim 62 wherein the preselected call information includes date and time of the telephone call, communication network, dialed number, and duration of the telephone call.

64. A method of actively interfacing between a plurality of telecommunication stations and a plurality of trunks that link to communication carriers of various media upon the initiation of an outgoing telephone call originating from one of the telecommunication stations, wherein one of the trunks is applied to a communication medium capable of linking to a plurality of carriers of the same medium, wherein the telecommunication stations and the trunks being situated upon a mobile environment, wherein a medium is any of various transmission means to accomplish a connection of the outgoing telephone call between a calling party at the telecommunication station and a called party at a remote location and a communication carrier is the specific agent through which the connection is made, the method comprising the steps of:
 (a) interrogating the different trunks for availability, the availability of a particular trunk being variably dependent upon location of the mobile environment and the medium to which the trunk is connected;

(b) determining the communication medium of least cost according to a preselected hierarchy of the media of communication; and (c) routing the telephone call from one of the telecommunication stations to the available trunk linked to the communication carrier having the medium of least cost;

(d) inputting and storing information on the geographic region in which the telecommunication stations are situated; and (e) selecting the communication carrier of least cost upon routing the telephone call to the trunk channel that is adapted to be connected to the trunk that is applied to the communication medium capable of linking to the plurality of carriers of the same medium, the selection of the communication carrier of least cost being based upon a lookup table of tariff information that relates to the different carriers of the communication medium capable of linking to the plurality of carriers of the same medium, the selecting by the means for selecting being accomplished by relating information in the lookup table and the information stored on the geographic region in which the telecommunication stations are situated.

65. The method of claim 64 wherein each of the media are represented by a network of the respective medium.

66. The method of claim 64 wherein the trunk applied to a communication medium capable of linking to a plurality of carriers is linked to satellite communications and the method further comprises the step of producing a preselected string of electronic signals appropriate to access a satellite to effect the satellite communications.

67. The method of claim 64 further including the steps of:

(a) capturing the telephone number dialed to make the outgoing call originating from one of the telecommunication stations;

(b) redialing the telephone by the adding or stripping of necessary digits so that the redialed telephone number is understood by the carrier to which the telephone call is routed.

68. The method of claim 64 further including the step of filtering the audio pass band of the telephone call through a plurality of frequency filters of different frequency ranges to identify indicia of call progress.

69. The method of claim 68 wherein the step of filtering includes determining when voice or data activity is absent such that the telephone call is terminated after a preselected period of time in which voice or data activity is absent.

70. The method of claim 64 further including the step of recording of preselected call information for billing purposes.

71. A method of actively interfacing between a plurality of telecommunication stations and a plurality of trunks that link to communication carriers of various networks upon the initiation of an outgoing telephone call originating from one of the telecommunication stations, wherein one of the trunks is applied to a communication network capable of linking to a plurality of carriers of the same network, wherein the telecommunication stations and the trunks being situated upon a mobile environment, wherein a network is a collection of carriers of the same medium that share access to that medium and a communication carrier is the specific agent through which the connection is made, the method comprising the steps of:

(a) interrogating the different trunks for availability, the availability of a particular trunk being variably dependent upon location of the mobile environment and the network to which the trunk is connected;

(b) determining the communication network of least cost according to a preselected hierarchy of the networks of communication; and (c) routing the telephone call from one of the telecommunication stations to the available trunk linked to the communication carrier having the network of least cost;

(d) inputting and storing information on the geographic region in which the telecommunication stations are situated; and (e) selecting the communication carrier of least cost upon routing the telephone call to the trunk channel that is adapted to be connected to the trunk that is applied to the communication network capable of linking to the plurality of carriers of the same network, the selection of the communication carrier of least cost being based upon a lookup table of tariff information that relates to the different carriers of the communication network capable of linking to the plurality of carriers of the same network, the selecting by the means for selecting being accomplished by relating information in the lookup table and the information stored on the geographic region in which the telecommunication stations are situated.

72. The method of claim 71 wherein the trunk applied to a communication network capable of linking to a plurality of carriers is linked to satellite communications and the method further comprises the step of producing a preselected string of electronic signals appropriate to access a satellite to effect the satellite communications.

73. The method of claim 71 further including the steps of:

(a) capturing the telephone number dialed to make the outgoing call originating from one of the telecommunication stations;

(b) redialing the telephone by the adding or stripping of necessary digits so that the redialed telephone number is understood by the carrier to which the telephone call is routed.

74. The method of claim 71 further including the step of filtering the audio pass band of the telephone call through a plurality of frequency filters of different frequency ranges to identify indicia of call progress.

75. The method of claim 74 wherein the step of filtering includes determining when voice or data activity is absent such that the telephone call is terminated after a preselected period of time in which voice or data activity is absent.

76. The method of claim 71 further including the step of recording of preselected call information for billing purposes.

77. An interface between a telecommunication station and a plurality of trunks that link to communication carriers of various media, the interface comprising:

(a) a station channel that connects to the telecommunication station;

(b) trunk channels that connect to the trunks that link to the communication carriers;

(c) means for routing a telephone call from the station channels to an available trunk channel; and (d) means for adjusting the audio level of the telephone call to compensate for differences between the various communication media.

* * * * *